United States Patent
Orban et al.

(10) Patent No.: US 10,699,822 B2
(45) Date of Patent: Jun. 30, 2020

(54) ELECTRICAL POWER TRANSMISSION FOR WELL CONSTRUCTION APPARATUS

(71) Applicant: SCHLUMBERGER TECHNOLOGY CORPORATION, Sugar Land, TX (US)

(72) Inventors: Jacques Orban, Katy, TX (US); Joe Rodney Berry, Cypress, TX (US); Joseph Hope, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/675,831

(22) Filed: Aug. 14, 2017

(65) Prior Publication Data
US 2019/0051431 A1 Feb. 14, 2019

(51) Int. Cl.
| | |
|---|---|
| *E21B 4/04* | (2006.01) |
| *H01B 9/00* | (2006.01) |
| *E21B 41/00* | (2006.01) |
| *E21B 7/06* | (2006.01) |
| *E21B 4/18* | (2006.01) |
| *H02G 11/02* | (2006.01) |
| *H02G 9/04* | (2006.01) |

(52) U.S. Cl.
CPC ............ *H01B 9/003* (2013.01); *E21B 4/04* (2013.01); *E21B 41/0085* (2013.01); *B65H 2701/34* (2013.01); *E21B 4/18* (2013.01); *E21B 7/068* (2013.01); *H02G 9/04* (2013.01); *H02G 11/02* (2013.01)

(58) Field of Classification Search
CPC ...................................... E21B 43/26

USPC ........................................................ 174/115
See application file for complete search history.

(56) References Cited

U.S. PATENT DOCUMENTS

| | | | |
|---|---|---|---|
| 421,781 | A | 2/1890 | Stoughton |
| 3,270,267 | A | 8/1966 | Nolte, Jr. |
| 3,802,137 | A | 4/1974 | Armstrong |
| 4,345,650 | A | 8/1982 | Wesley |
| 4,751,969 | A | 6/1988 | Klaeger |
| 4,795,893 | A | 1/1989 | Ugon |
| 5,292,108 | A | 3/1994 | Sutton |
| 6,268,574 | B1 | 7/2001 | Edens |

(Continued)

FOREIGN PATENT DOCUMENTS

| | | |
|---|---|---|
| JP | H0413543 A | 1/1992 |
| WO | 2007019292 A2 | 2/2007 |

(Continued)

OTHER PUBLICATIONS

Cat® MD6640 Rotary Blasthole Drill, Brochure, 4 pages, 2013.

(Continued)

*Primary Examiner* — Stanley Tso
(74) *Attorney, Agent, or Firm* — Rachel E. Greene

(57) ABSTRACT

The present disclosure introduces apparatus and related methods pertaining to a first electrical power cable, a second electrical power cable, and a set of breakers. The first and second electrical power cables each extend a variable distance between a static system at a wellsite and a movable system at the wellsite. The breakers are operable to select either of the first and second electrical power cables to couple electrical power from a stationary electrical power source at the static system to a load at the movable system.

9 Claims, 20 Drawing Sheets

(56) References Cited

U.S. PATENT DOCUMENTS

| | | | |
|---|---|---|---|
| 6,675,888 B2 | 1/2004 | Schempf et al. | |
| 6,731,562 B2 | 5/2004 | Roohparvar | |
| 6,971,457 B2 | 12/2005 | Baird | |
| 7,165,619 B2 | 1/2007 | Fox et al. | |
| 7,849,924 B2 | 12/2010 | Surjaatmadja et al. | |
| 8,299,748 B2 | 10/2012 | Soma et al. | |
| 8,332,106 B2 | 12/2012 | Yuet et al. | |
| 8,881,806 B2 | 11/2014 | Xie et al. | |
| 9,360,134 B2 | 6/2016 | Orgeron et al. | |
| 9,644,431 B2 | 5/2017 | Myers et al. | |
| 9,850,111 B2 | 12/2017 | Trevisani | |
| 2002/0175522 A1 | 11/2002 | Wacknov et al. | |
| 2007/0096538 A1 | 5/2007 | Niemi et al. | |
| 2007/0199872 A1 | 8/2007 | Mueller et al. | |
| 2008/0099197 A1* | 5/2008 | Payne | E21B 41/0021 166/250.01 |
| 2008/0314579 A1 | 12/2008 | Den Boer et al. | |
| 2009/0188677 A1 | 7/2009 | Ditta et al. | |
| 2009/0214196 A1 | 8/2009 | Bremnes | |
| 2009/0283324 A1 | 11/2009 | Konduc et al. | |
| 2009/0321135 A1 | 12/2009 | Vora | |
| 2010/0089584 A1* | 4/2010 | Burns | E21B 43/2401 166/302 |
| 2010/0143044 A1 | 6/2010 | Kadaster et al. | |
| 2011/0280104 A1 | 11/2011 | McClung | |
| 2011/0281447 A1 | 11/2011 | Kano et al. | |
| 2013/0140092 A1 | 6/2013 | Warr | |
| 2013/0180186 A1 | 7/2013 | Konduc et al. | |
| 2013/0315676 A1 | 11/2013 | Orgeron et al. | |
| 2014/0048286 A1 | 2/2014 | Rojas et al. | |
| 2014/0251623 A1* | 9/2014 | Lestz | E21B 43/26 166/308.2 |
| 2015/0114652 A1 | 4/2015 | Lestz et al. | |
| 2015/0114717 A1 | 4/2015 | Fortson et al. | |
| 2015/0267487 A1 | 9/2015 | Bujold et al. | |
| 2015/0361784 A1* | 12/2015 | Davis | G01N 27/82 324/543 |
| 2016/0195911 A1* | 7/2016 | Chapel | G06F 1/3287 713/340 |
| 2016/0293294 A1 | 10/2016 | Matlack et al. | |
| 2017/0044894 A1 | 2/2017 | Surowinski et al. | |
| 2019/0049909 A1 | 2/2019 | Krippner et al. | |
| 2019/0051431 A1 | 2/2019 | Orban et al. | |
| 2019/0065789 A1 | 2/2019 | Gonchar et al. | |

FOREIGN PATENT DOCUMENTS

| | | |
|---|---|---|
| WO | 2010070305 A2 | 6/2010 |
| WO | 2017119896 A1 | 7/2017 |

OTHER PUBLICATIONS

Loadmaster, "Land, Desert, Arctic, or Offshore Our Drilling Equipment is Meticulously Designed", www.loadmasterur.com, 38 pages, 2017.

Joy Global, General Specification: 320XPC Rotary Blasthole Drill, joyglobal.com, 4 pages, 2016.

Conductix Wampfler, "Giant Land-based Oil Rigs Become Mobile with Conductix-Wampfler Cable Reels", Jul. 18, 2016, 3 pages, http://www.conductix.us/en/news/2016-07-18/giant-land-based-oil-rigs-become-mobile-conductix-wampfler-cable-reels.

Nexans AmerCable, Zone 1 (EX) Rated Cable Assemblies: Offhsore Bridle Systems—Tender Assisted drilling Unit/Bridle and Festoon Systems, 4 pages, 2014, http://www.amercable.com/doc/catalogs/og/bridle.pdf.

Varhaug, "Subsea Infrastructure", Schlumberger, Oilfield Review 2016, 2 pages, 2016, http://www.slb.com/-/media/Files/resources/oilfield_review/defining_series/Defining-Subsea-Infrastructure.pdf?la=en&hash=C5D993CA2AF08B14F36ECFC7DD18CB9D48AF7F52.

Joy Global, 320XPC Rotary Blasthole Drill Product Overview, accessed via http://pdf.directindustry.com/pdf/joy-global-surface-mining-p-h-mining-equipment-i/p-h-320xpc/40115-378357.html; 8 pages, 2012.

P&H, P&H 320XPC Blasthold Drill, accessed via http://pdf.directindustry.com/pdf/joy-global-surface-mining-p-h-mining-equipment-i/p-h-320xpc/40115-154681.html; 6 pages, 2009.

Caterpillar, Land Righ SCR Power Podules, Caterpillar Inc., 4 pages, 1999.

Bentec Drilling Rigs. Brochure [online]. Bentec GmbH Drilling Oilfield Systems, Germany, Dec. 2016. Retrieved from the Internet: URL: https://www.bentec.com/wp-content/uploads/2016/12/Bentec_Drilling_Rigs_EN_122016.pdf See pp. 1-11.

* cited by examiner

ELECTRICAL POWER TRANSMISSION FOR WELL CONSTRUCTION APPARATUS

BACKGROUND OF THE DISCLOSURE

In the drilling of oil and gas wells, drilling rigs are used to create a well by drilling a wellbore into a formation to reach oil and gas deposits. During the drilling process, as the depth of the wellbore increases, so does the length and weight of the drillstring. A drillstring may include sections of drill pipe, a bottom hole assembly, and other tools for creating a well. The length of the drillstring may be increased by adding additional sections of drill pipe as the depth of the wellbore increases. Various components of a drilling rig can be used to advance the drillstring into the formation. In some applications, several wells may be drilled on the same pad with limited separation distance. In such applications, a portion of the drilling rig may remain static during the process of constructing multiple wells, while a central package (i.e., a central portion) may be moved to above each well to be drilled.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a first electrical power cable, a second electrical power cable, and a set of breakers. The first and second electrical power cables each extend a variable distance between a static system at a wellsite and a movable system at the wellsite. The breakers are operable to select either of the first and second electrical power cables to couple electrical power from a stationary electrical power source at the static system to a load at the movable system.

The present disclosure also introduces a method including, at a wellsite, providing electrical power from a stationary electrical power source at a static system to a load at a movable system via a first electrical power cable extending a variable distance between the static system and the movable system. The method also includes selecting a second electrical power cable extending the variable distance between static system and the movable system, and providing electrical power from the stationary electrical power source to the load via the second electrical power cable instead of via the first electrical power cable.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
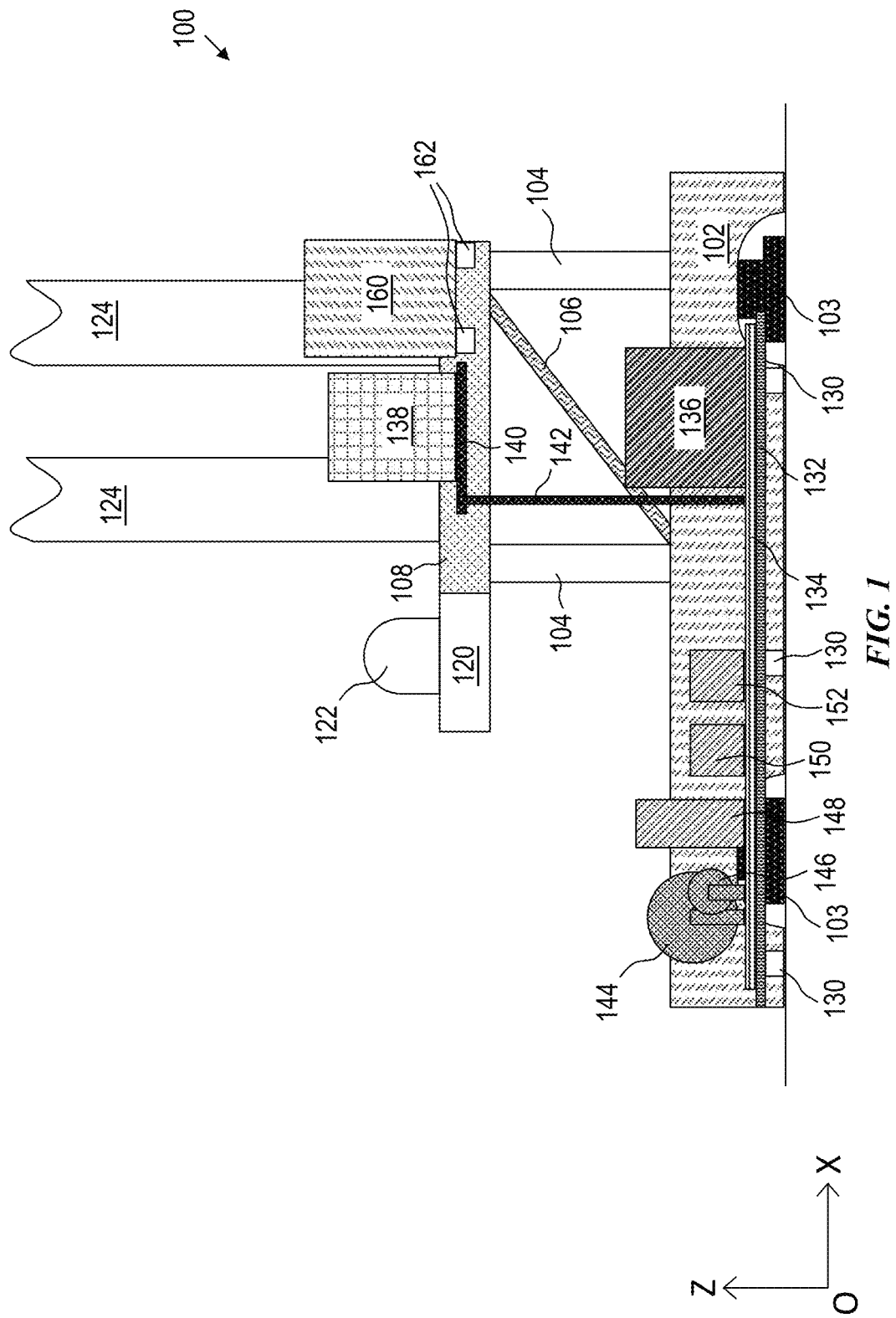
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Systems and methods and/or processes according to one or more aspects of the present disclosure may be used or performed in connection with well construction operations, such as at a wellsite for constructing a wellbore to obtain hydrocarbons (e.g., oil and/or gas) from a formation, including drilling the wellbore. For example, some aspects may be described in the context of drilling a wellbore in the oil and gas industry. One or more aspects of the present disclosure may be applied in other contexts, such as for any construction operations.

One or more aspects of the present disclosure may permit simpler deployment of a well construction apparatus where some components (e.g., electrical components) are located at the movable well construction apparatus (e.g., "walking" rig) that may be powered by medium-voltage supplied by a medium-voltage power cable, such as a 4,160 V power cable. The power cable may be configured to supply an alternating current (AC) (e.g., 3 phase, 6 phase, etc.) or a direct current (DC). Such power cable may be powered by a power source located at a stationary position at the wellsite and at an end of the power cable. Various examples and modifications are described herein, and a person of ordinary skill in the art will readily understand other modifications that can be made to those examples and modifications, which are within the scope of the present disclosure.

Figure 2:
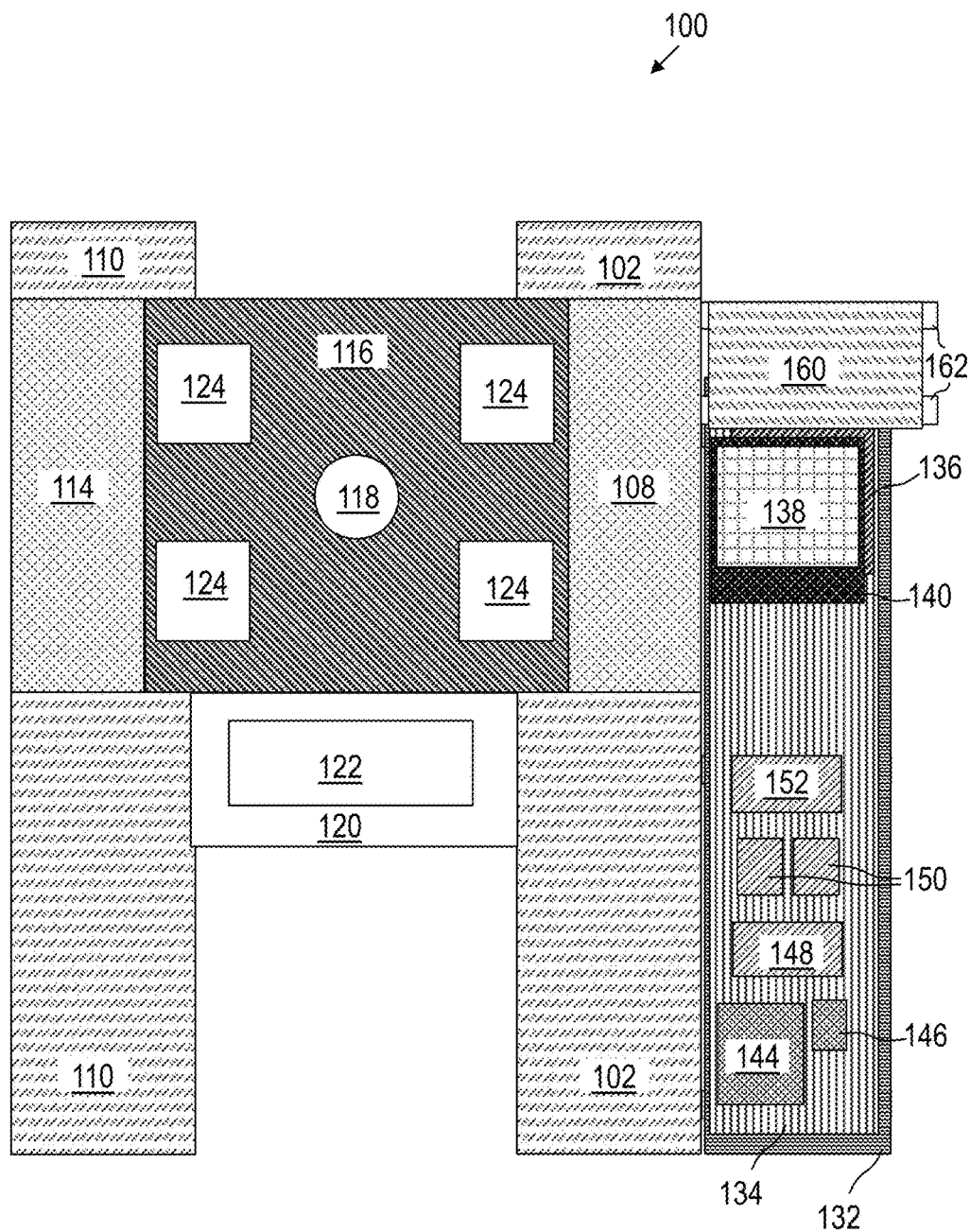
FIG. 2 is a schematic view of at least a portion of an example implementation of apparatus according to one or more aspects of the present disclosure.

FIGS. 1 and 2 are respective schematic views of at least a portion of a simplified, example implementation of a well construction apparatus 100 according to one or more aspects of the present disclosure. The well construction apparatus 100 is an example implementation of a central package of a walking land drilling rig according to one or more aspects of the present disclosure. FIGS. 1 and 2 illustrate different schematic views of the well construction apparatus 100 and will be described together. Each of these figures includes an approximate orientation point O with X-Y-Z coordinate axes to facilitate orienting the different views. FIGS. 1 and 2 illustrate the well construction apparatus 100 where, after deployment of at least some modules, a portion of the well construction apparatus 100 is raised. Examples of deployment and raising of a portion of the well construction apparatus 100 are described below.

The well construction apparatus 100 in this example may be deployed to a wellsite as separate modules, each of which may be transported to the wellsite by a separate vehicle (e.g., a truck and trailer). The various modules may be arranged at the wellsite and mechanically attached together as appropriate. Various ones of example modules are described below with respect to the well construction apparatus 100, and other implementations may comprise fewer, additional, and/or different modules.

The well construction apparatus 100 includes two side box modules, a center (or rig floor) module, a drawworks module, a mast module, a DCR module, and a local electrical room module. In the deployment of these modules at the wellsite (e.g., rig up), the side box modules are arranged in parallel at the wellsite. A first side box module includes a first footing structure 102, first movable support structures 104, a hydraulic lift 106, and a first rig floor frame 108. A second side box module includes a second footing structure 110, second movable support structures (not specifically illustrated), a hydraulic lift (not specifically illustrated), and a second rig floor frame 114. The first and second side box modules together form at least a portion of a substructure of the well construction apparatus 100. As initially deployed, the first and second side box modules are collapsed, and, as will become apparent from subsequent description, the first and second side box modules include a hydraulics system (e.g., including the hydraulic lift 106) that raises a rig floor of the well construction apparatus 100. When the hydraulics system is operated, the first movable support structures 104 and the second movable support structures can rotate around respective hinge points in the first footing structure 102 and first rig floor frame 108, and in the second footing structure 110 and second rig floor frame 114 to expand the first and second side box modules and raise the rig floor of the well construction apparatus 100.

Additionally, the first footing structure 102 and the second footing structure 110 each include two hydraulically controlled feet 103. In other examples, more hydraulically controlled feet may be used. The feet 103 can be controlled to move (e.g., "walk") the well construction apparatus 100 to and from different locations at the wellsite, e.g., after the well construction apparatus 100 has been fully deployed. The well construction apparatus 100 also includes a hydraulics system that controls the operations of the feet 103.

With the first and second side box modules deployed in parallel at the wellsite, the center module is deployed between the first and second side box modules. The center module is attached to the first rig floor frame 108 and the second rig floor frame 114. The center module includes a rig floor frame that further forms at least a portion of the substructure of the well construction apparatus 100 and includes a rig floor 116. The first rig floor frame 108, the second rig floor frame 114, and the rig floor 116 form a rig floor structure. Additionally, an opening 118 is through the rig floor 116. During some operations of the well construction apparatus 100 such as drilling, a drillstring or other tubulars may extend through the opening 118 to a formation in the underlying earth.

The drawworks module is deployed attached to the center module and/or the first and second side box modules. The drawworks module includes a drawworks skid 120 that is attached to the center module (e.g., the rig floor 116 and/or rig floor frame) and/or to the first rig floor frame 108 and second rig floor frame 114. A drawworks 122, which may be used for, among other things, raising and lowering a drillstring during drilling operations, is mounted on the drawworks skid 120.

The mast module is deployed on the rig floor 116. In this example, the mast module includes a mast 124 (a portion of which is shown in the figures), which may be telescopic. From a vehicle on which the mast module is transported, the mast module is attached to the rig floor 116 at one or more anchor points and is rotated around the anchor point(s) to an upright position. A hydraulics system may be used to rotate the mast 124 into the upright position. The mast 124 may then be telescopically extended to a mast height. A crown block (i.e., a sheaves cluster) may be at and supported by an upper portion of the mast 124.

The mast module further includes a top drive (not illustrated) with associated rotary motor, gear box or transmission, drive shaft, and swivel. A hook and traveling block may be mechanically coupled to the top drive. The top drive may comprise a rail guide system on the mast 124 that guides the top drive along vertical movement during drilling operations and prevents the top drive from rotating as a result of torque that the top drive applies to a drillstring during drilling operations. The top drive may be secured in the mast 124 during transport and rig up until the top drive is supported by a drill line as described below.

The local electrical room module is deployed adjacent the first side box module. The first footing structure 102 of the first side box module includes support beams 130 that support the local electrical room module during deployment of the local electrical room module. The support beams 130 may be hinged at the first footing structure 102. During transport of the first side box module, the support beams 130 may be folded, by operation of the hinge, to the first footing structure 102. In preparation of deployment and during deployment of the local electrical room module, the support beams 130 may be unfolded to extend perpendicularly, for example, from the first footing structure 102 and may support the local electrical room module. By having the support beams 130 extending from the first footing structure 102 and supporting the local electrical room module, the well construction apparatus 100 may be repositioned without having to separately reposition the local electrical room module during a rig walk operation, for example.

A skid support 132 may be used to further support the local electrical room module. The skid support 132 can be a rigid frame, for example, separate from the local electrical room module. The skid support 132 can be placed on the support beams 130 prior to skidding of the local electrical room module. The skid support 132 can facilitate skidding the local electrical room module on the support beams 130.

The local electrical room module includes a skid 134 that supports various other components of the local electrical room module. The skid 134 and the components mounted thereon can be unloaded from a vehicle (e.g., a trailer) by a pulley system that forces the skid 134 from the vehicle and onto the skid support 132, where the skid 134 is then slid into position on the skid support 132.

A lower electrical room 136 is mounted on the skid 134. The lower electrical room 136 can include various electrical components, such as for control (such as programmable logic controllers (PLCs)), communication, and/or others. Some components that can be included in some examples are described in further detail below.

A raisable apparatus 138 is mounted on a horizontal floor 140, which is attached to and supported by a boom 142. The raisable apparatus 138 can be or comprise various components. For example, the raisable apparatus 138 may include plugs to which one or more cables on the rig floor can be connected. The plugs from the raisable apparatus 138 may be grouped in one or more plug panels. The cables can then extend from the raisable apparatus 138 along and supported at least in part by the boom 142 to, e.g., the lower electrical room 136. The horizontal floor 140 is attached to the boom 142 by a joint, hinge, or the like, for example, at one end of the boom 142. The boom 142 is attached to and supported by the skid 134 by a joint, hinge, or the like, for example, at the other end of the boom 142, which may permit rotation of the boom 142 around the joint, hinge or the like. During transport, the horizontal floor 140 and boom 142 are collapsed or folded (e.g., in a "Z" configuration with the skid 134). In some examples, various mechanism may be present to prevent the horizontal floor 140 and boom 142 from collapsing or folding fully to the skid 134, such as blocks, stops, pins, and/or other example mechanisms. Hence, in some examples, the boom 142 is rigid enough to support the horizontal floor 140 and raisable apparatus 138, e.g., during transport. In some examples, the horizontal floor 140 and boom 142 may collapse or fold fully to the skid 134. In some other examples, the boom 142 may adjust in length such that the floor 140 is aligned with respect to a predetermined reference level associated with the rig floor 108 or with respect to the DCR 160. At deployment, the horizontal floor 140 can be mechanically coupled to the first rig floor frame 108, for example. In some examples, the horizontal floor 140 is mechanically coupled to the first rig floor frame 108 via a rigid link and pins, for example. In other examples, the horizontal floor 140 can be directly and/or indirectly mechanically coupled to the first rig floor frame 108 via other mechanisms. During deployment, by mechanically coupling the horizontal floor 140 to the first rig floor frame 108, the first rig floor frame 108, e.g., and with the boom 142, can support the horizontal floor 140 and the raisable apparatus 138.

In the illustrated example, a power cable spool 144 is mounted on the skid 134. The power cable spool 144 can reel in and release a medium or high-voltage power cable, which may extend to a stationary location at the wellsite that may include a generator (or set of generators) and/or a power control room. The generator may be a combination of a diesel, gasoline, natural gas, or other type of engine with an electrical generator, referred to in the art as a genset. Thus, the terms generator and genset may be used interchangeably herein.

The power cable may be operable to transmit electrical current at about 4,160 volts (V) or other voltages ranging, for example, between about 1.0 kilovolts (kV) and about 100 kV. The power cable may also be a thick gauge cable with one or more conductors, in some examples. Additional details of the power cable and power cable spool 144 are described below in further examples.

A communication cable spool 146 is also mounted on the skid 134. The communication cable spool 146 can wind and unwind a communication cable, which may be from a control room. The communication cable may include and/or be a fiber optic cable, a thin gauge cable, such as may comprise multiple low voltage wires, or other example cables, in some examples.

One or more transformers 148 and one or more brake resistors 150 (e.g., two brake resistors 150) are mounted on the skid 134. Multiple physical resistors may be electrically coupled in parallel and/or serially to form a brake resistor. Additional details of the transformers 148 and brake resistors 150 are described below. One or more radiators 152 are also mounted on the skid 134. The radiators 152 can be used to cool various components of the local electrical room module, such as by pumping cooling fluid through conduit to the lower electrical room 136 and/or the raisable apparatus 138, for example. In some examples, air cooling may be used to remove heat from the various components, such as by using heat spreaders (e.g., with a heat sink that may include high heat conductance fins), and radiators may be omitted or used in addition to the air cooling in those examples.

The DCR module is deployed adjacent the first side box module. The first rig floor frame 108 of the first side box module includes support beams 162 that support the DCR module, e.g., a DCR 160, during deployment of the DCR module. The support beams 162 may be hinged at the first rig floor frame 108. During transport of the first side box module, the support beams 162 may be folded, by operation of the hinge, to the first rig floor frame 108. In preparation of deployment and during deployment of the DCR module, the support beams 162 may be unfolded to extend perpendicularly, for example, from the first rig floor frame 108 and may support the DCR module. The DCR 160 may be deployed by, for example, a forklift, crane, or other example equipment capable of lifting and placing the DCR 160 on the support beams 162. The DCR module may be deployed before or after deployment of the local electrical room module. The raisable apparatus 138 of the local electrical room module may be proximate the DCR 160 when the local electrical room module and the DCR module are deployed. Additionally, the DCR 160 may comprise one or more plug panels on one or more walls thereof and that are exteriorly facing. The plug panel(s) of the DCR 160 may be connected to one or more of the plug panel(s) of the raisable apparatus 138 via one or more cables. Hence, components in the DCR 160 may be electrically coupled to the local electrical room module.

After deploying the above-described modules, the rig floor 116, the first rig floor frame 108, and the second rig floor frame 114 (e.g., the rig floor structure) of the well construction apparatus 100 are raised to an operational (e.g., drilling) level. The rig floor 116, the first rig floor frame 108, and the second rig floor frame 114, in the illustrated example, are raised via operation of the hydraulics system including the hydraulic lift 106 of the first side box module and the hydraulic lift of the second side box module. The hydraulic lifts can be extended, which cause the first movable support structures 104 and the second movable support structures to rotate to an upright, vertical position that, in turn, raises the rig floor 116, the first rig floor frame 108, and the second rig floor frame 114.

With the raising of the first rig floor frame 108, the horizontal floor 140 with the raisable apparatus 138 are also lifted. Since the horizontal floor 140 is mechanically coupled to the first rig floor frame 108, the raising of the first rig floor frame 108 also causes the horizontal floor 140 and raisable apparatus 138 to be raised.

With the rig floor 116, the first rig floor frame 108, and the second rig floor frame 114 raised and the mast 124 extended, a drill line can be reeved from a deadline anchor on the rig floor 116 through sheaves of a traveling block mechanically coupled to the top drive and sheaves of a crown block on the mast 124 to the drawworks 122. By releasing out and reeling in the drill line at the drawworks 122, the top drive can be lowered and raised, respectively, along the mast 124 during drilling operations. The top drive can be operated using a power system, such as described below.

Additional modules and components may be incorporated into the well construction apparatus 100. For example, a catwalk module, including a powered catwalk and tubular racks, and a pipe handling manipulator module can be included in the well construction apparatus 100. Further, a drilling fluid circulation and treatment system module including, for example, a shale shaker, a desander, a desilter, a degasser, a hopper and/or one or more drilling fluid tanks may be included in the well construction apparatus 100 and/or separate from the well construction apparatus 100 at the well site.

Even further some components may be implemented at the wellsite separate from the well construction apparatus 100. In some example, power generation and control are at the wellsite separate from (e.g., some distance away from) the well construction apparatus 100, as described below. The power generation may include one or more generators operable to provide electrical power. A power control room (PCR) may control the operation of the power generation and, e.g., provide a protective apparatus in the case of a fault. The well construction apparatus 100 may also be powered from the grid.

Figure 3:
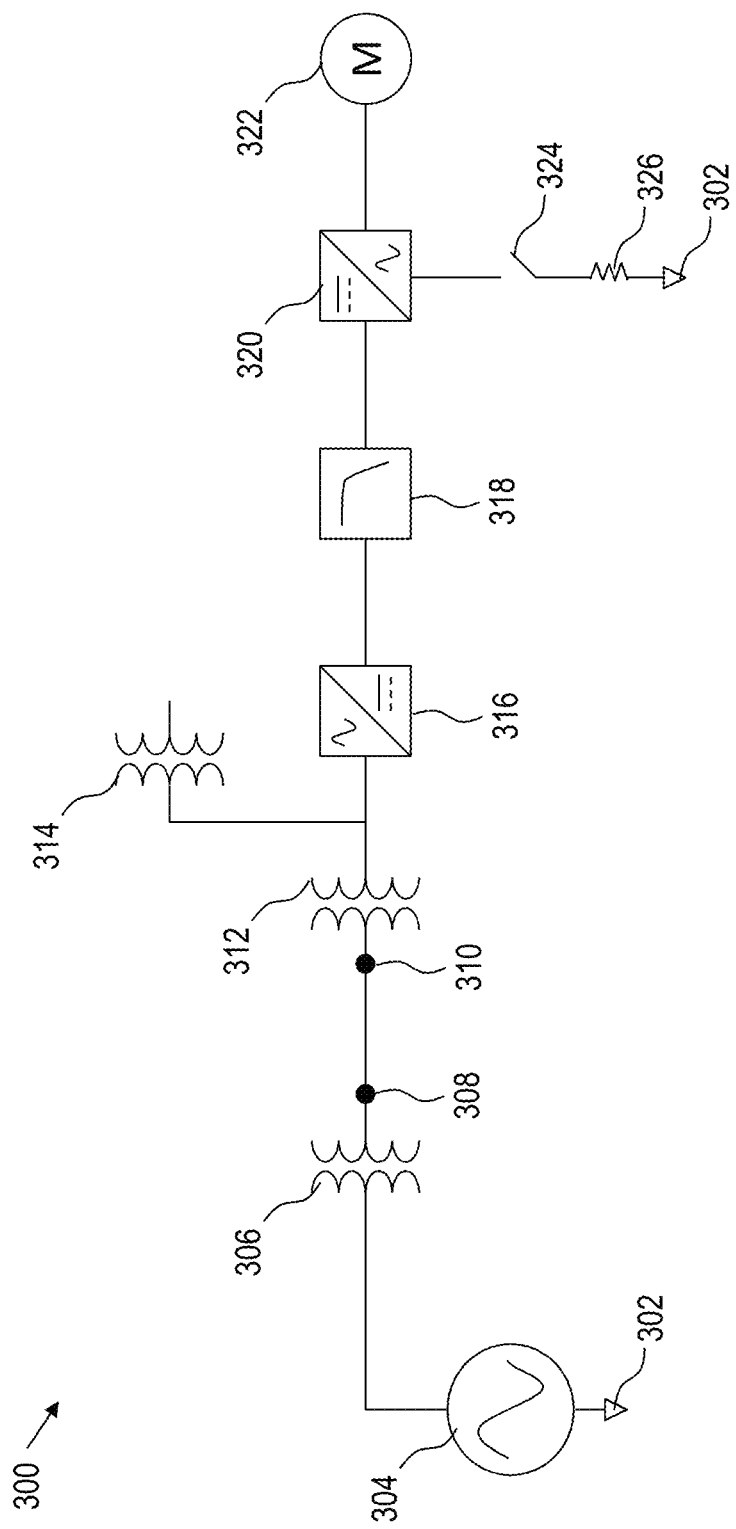
FIG. 3 is a schematic view of at least a portion of an example implementation of apparatus according to one or more aspects of the present disclosure.

FIG. 3 is a schematic view of at least a portion of a simplified, example implementation of a well construction apparatus according to one or more aspects of the present disclosure. FIG. 3 illustrates at least a portion of a one-line schematic of a power system 300 of a well construction apparatus. The power system 300 can include other components that are not illustrated, such as control components like circuit breakers, relays, switches, and others. A person having ordinary skill in the art will readily understand the applicability of such components, which are within the scope of the present disclosure.

The power system 300 includes one or more generators 304 or other power sources, which may be equipped with grounding detection systems. However, the body of the generator 304 may be connected to ground to protect personnel. The generators 304 can include respective prime movers, such as diesel powered engines, that drive alternators to generate an AC electrical charge. In some examples, the generators 304 generate 600 V at 60 hertz (Hz). The generators 304 are electrically coupled at a node to a primary winding of a transformer 306. The transformer 306 can be at a PCR at a stationary position at the wellsite during operations, for example, and hence, the secondary winding of the transformer 306 can be electrically coupled by a power cable from a connection node 308 at (or near) the power control room to a connection node 310 at the local electrical room module of the well construction apparatus, e.g., at the movable end of the electrical power cable. However, the generator 304 may be a medium voltage generator, which may not be coupled with the transformer 306. Also, the well construction apparatus 100 may be powered directly from the grid either in medium-voltage or even high-voltage.

The power cable may, during deployment at the wellsite, be at least partially wound on a power cable spool (e.g., power cable spool 144 in FIGS. 1 and 2) and/or at least partially lie on the ground at the wellsite. The transformer 306 can step up a voltage between the primary winding and the secondary winding. In some examples, the transformer 306 steps up the voltage from 600 V to 4,160 V, which can result in a voltage of 4,160 V at the connection nodes 308 and 310. However, it is to be understood that a voltage level within the scope of the present disclosure may range between about 2,400 V and about 13,800 V, or even as high as about 34,500 V.

The connection node 310 is electrically coupled to a primary winding of a transformer 312 on the local electrical room module of the well construction apparatus. The transformer 312 can step down a voltage between the primary winding and the secondary winding. In some examples, the transformer 312 steps down the voltage from 4,160 V to 600 V. However, the well construction apparatus 100 may be powered in medium-voltage.

The secondary winding of the transformer 312 is electrically coupled to a primary winding of a transformer 314. The transformer 314 can further step down a voltage between the primary winding and the secondary winding thereof. The output from the secondary winding of the transformer 314 can be used, e.g., to power various components of the local electrical room module, such as communication devices, PLCs, and/or other example components, that are not specifically illustrated. In some examples, the transformer 312 steps down the voltage from 600 V to 120 V. However, in another implementation of the power system 300, the generators 304 may directly deliver a medium voltage (i.e., 4,160 V) or another predetermined voltage. In such implementations, the transformer 306 may not be included or utilized.

The secondary winding of the transformer 312 is also electrically coupled to an input node of a rectifier 316. The rectifier 316 changes the AC power to DC power. A person of ordinary skill in the art will readily understand different configurations useable for the rectifier 316, which are within the scope of the present disclosure. In some examples, the rectifier 316 changes the power from 600 V AC to 800 V DC at an output node of the rectifier 316. The rectifier 316 may be a 6-pulse, 12-pulse, or even a 24-pulse rectifier operable to reduce harmonics. The step down transformer 312 may comprise multiple secondary windings to create the intended number of phases.

The output node of the rectifier 316 is electrically coupled to an input node of a filter 318, such as a low pass filter. By passing the output of the rectifier 316 through the filter 318, any ripples and/or noise in the power signal can be reduced and/or removed. Hence, the output of the filter 318 can be a DC power signal with reduced ripples and/or noise compared to the output of the rectifier 316. However, when a 12- or 24-pulse rectifier is used, the output filter 318 can be removed.

The output node of the filter 318 is electrically coupled to an input node of an inverter 320. The inverter 320 changes the DC power to AC power and permits control and varying of the frequency of the output AC power. A person of ordinary skill in the art will readily understand different configurations useable for the inverter 320, which are within the scope of the present disclosure.

The output node of the inverter 320 is electrically coupled to a top drive motor 322. The top drive motor 322, in this example, is an asynchronous induction motor (e.g., a three-phase squirrel-cage motor) that operates with a torque and speed, e.g., for rotating a drillstring, that is controllable by the frequency of the power, e.g., the output of the inverter 320. A person of ordinary skill in the art will readily understand variable frequency drive (VFD) principles for controlling the top drive motor 322, which are within the scope of the present disclosure.

A chopper 324 and brake resistor 326 are serially electrically coupled between the inverter 320 and ground 302. Under some operating conditions, the top drive motor 322 may generate rather than consume power, such as when the top drive motor 322 begins to freely rotate at too great of a speed. In such situations, the chopper 324 is controlled to close and open, such as by a PLC and based on a pulse-width-modulated signal, to divert power to the brake resistor 326, which dissipates the power. However, the braking power may be regenerated back to the power system or the grid, such as by using a controlled rectifier (e.g., a silicon-controlled rectifier (SCR), an insulated-gate bipolar transistor (IGBT) rectifier, etc.).

Although discussed singularly, various components described in the power system 300 may comprise multiple components in parallel (e.g., two inverters 320 electrically coupled together in parallel) or combinations of multiple components in parallel. A person having ordinary skill the art will readily understand such a modification, which is within the scope of the present disclosure.

Although not specifically illustrated, similar components, such as one or more of a rectifier, a filter, an inverter, chopper, brake resistor, and induction motor, can be included in the power system 300 for the drawworks module, for example. For example, a rectifier, a filter, an inverter, chopper, brake resistor, and induction motor of the drawworks can be electrically coupled the same as respective components in FIG. 3 from the transformer 312 for the motor of the top drive. A person having ordinary skill in the art will readily understand the applicability of such components, which is within the scope of the present disclosure.

As introduced herein, a power cable spool is mounted in a local electrical room module of a well construction apparatus, which may be movable, e.g., by walking, to reel and unreel a power cable, such as a 4,160 V power cable, that is connected to a stationary generator set and/or power control room at the wellsite. By reeling and unreeling the power cable at the well construction apparatus, the cable may be less susceptible to abrasion and damage compared to a non-reeled electrical power cable or an electrical power cable reeled on the stationary side.

In some examples, operations of the well construction apparatus can be powered by a three-phase AC power utilized by operations of the well construction apparatus in these examples, the well construction apparatus can consume a current level from about 1,200 to 4,000 amperes (A) when operating at 600 V AC. If power is conducted at 600 V AC from the one or more generators to the well construction apparatus, multiple conductors and/or conductors with a large cross-sectional area might be used to avoid overheating of the conductors and/or to avoid a substantial voltage drop (by reducing a current density through the conductors), such as between the generators (and/or power control room) and the well construction apparatus, which may include a separation distance of up to 150 meters, for example. To support such power levels at a wellsite in a more practical manner, a transformer may be provided at the stationary location (e.g., proximate the generators and/or power control room) and at the well construction apparatus (e.g., as part of the local electrical room module) with a three-phase power distribution cable therebetween. The transformer at the stationary location may increase the voltage from about 600 V to 4,160 V, which proportionately reduces the current level through the power cable between the stationary location and the well construction apparatus. The resulting current level is reduced to about 200 to 500 A, for example. Different voltages and/or currents can be used or achieved in other example implementations.

The power cable can be reeled onto a rotatable spool that is carried with and affixed to the local electrical room module deployed as part of the well construction apparatus, such as the power cable spool 144 in FIGS. 1 and 2. The power cable can be wound or unwound when the well construction apparatus is moved, such as between wellbores. By positioning the power cable spool on the local electrical room module of the well construction apparatus, chafing and other abrasion of the insulation on the power cable may be reduced when the well construction apparatus is repositioned, such as between wellbores.

Figure 4:
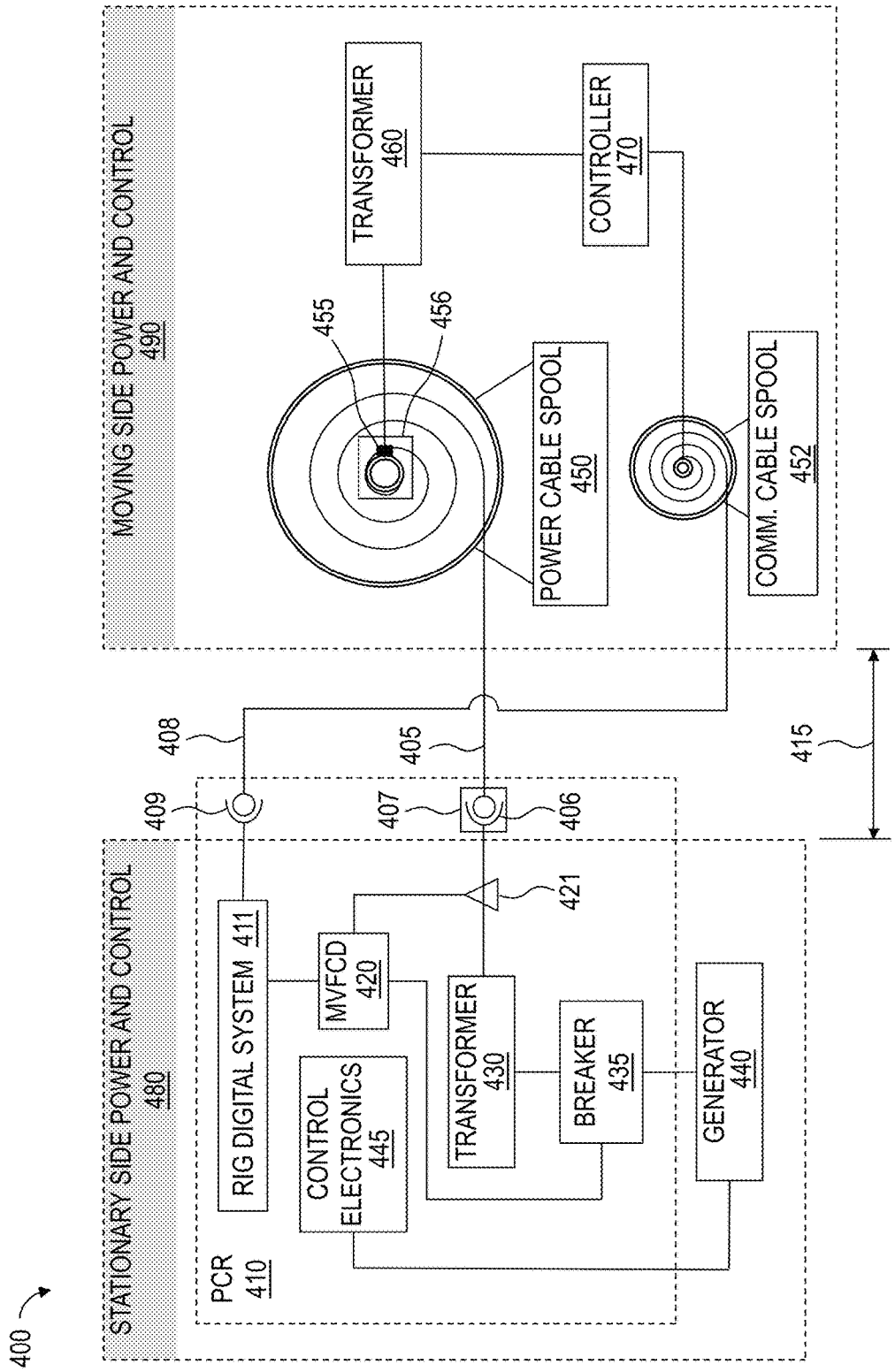
FIG. 4 is a schematic view of at least a portion of an example implementation of apparatus according to one or more aspects of the present disclosure.

FIG. 4 is a schematic view of at least a portion of a power distribution system 400 at a wellsite for a well construction apparatus, which is capable of moving, e.g., by "walking", according to one or more aspects of the present disclosure. The power distribution system 400 of FIG. 4 can implement at least a portion of the power system 300 of FIG. 3, for example.

The power distribution system 400 includes a stationary side power and control apparatus 480 at the well site and a moving side power and control apparatus 490. The moving side power and control apparatus 490 includes a local electrical room module (LER) and other modules of the moving portion of the well construction apparatus.

At the stationary side 480, one or more generators 440 (e.g., generators 304 in FIG. 3) that produce a three-phase AC voltage, such as 600 V AC, are coupled to a transformer 430 (e.g., transformer 306 in FIG. 3) that steps up the AC voltage, such as to 4,160 V. One or more power breakers 435 are installed between the generator 440 and the transformer 430. A medium-voltage fault circuit detector (MVFCD) 420 monitors power cables on the medium voltage side (e.g., via sensors 421, such as the measurement transformers described below with respect to FIGS. 5-7). Upon detecting one or more faults, the MVFCD 420 forces the breaker 435 to open, stopping the application of medium voltage to a medium-voltage power cable 405 extending between the stationary side 480 and the moving side 490. The MVFCD 420 associated with the breaker 435 may be referred to herein as a medium-voltage fault circuit interrupter (MVFCI).

A PCR 410 may include components (e.g., PLCs) that control and/or protect the generator 440 and transformer 430, for example. Additionally, the PCR 410 may include control electronics 445 and/or other components that control and/or facilitate bringing one or more of the generators 440 online in the power distribution system 400, such as by monitoring the voltage, phase, and/or frequency of the power generated by the one or more generators 440 relative to power being distributed by the power distribution system 400. Further, the MVFCD 420 may include components that detect ground faults proximate the transformer 430, such as on an output node of the transformer 430. If a fault is detected by a ground fault circuit detector (GFCD) of the MVFCD 420, the MVFCD 420 can control components, such as one or more circuit breakers 435 and/or switches, to isolate the fault and/or remove, e.g., the transformer 430 from the fault.

Electrical power may be transmitted from the stationary side 480 generator 440 to the moving side 490 of the walking rig (i.e., central package) during the walking operations, such as to supply the electrical power to the walking rig to perform such walking operations and other rig operations (e.g., drilling). Thus, the well construction apparatus may utilize power management of electrical power received from the stationary side 480 to perform the walking operations and may not include or otherwise utilize an electrical generator located on the walking rig to perform the walking and/or other operations.

The medium-voltage power cable 405 may be equipped with at least a portion of a connector assembly 406 operable to electrically connect the cable 405 with the transformer 430. The connector assembly 406 may be contained in an enclosure or protection box 407 at the PCR 410. The protection box 407 comprises a door or lid (not shown) that may be opened to permit access to the connector assembly 406, such as for connecting and disconnecting the connector assembly 406. The power cable 405 conducts AC power from the stationary side 480 (e.g., from the transformer 430 and/or PCR 410) over a variable distance 415 to the moving side 490. A power cable spool 450 is mounted on the moving side 490, such as illustrated in and described with respect to FIGS. 1 and 2. The cable spool 450 is capable of reeling in and out and at least partially supporting the power cable 405. The power cable 405, as terminated at the cable spool 450, is electrically coupled to a transformer 460 (e.g., transformer 310 in FIG. 3) that is located at the moving side 490 and operable to step down the voltage supplied from the power cable 405, such as to 600 V AC. The lower voltage, e.g., 600 V AC, may be supplied as a power source voltage to controller 470 of the well construction apparatus, such as for distribution to a top drive, drawworks, and/or other components and equipment. The power cable spool 450 is equipped with a slip-ring system 455 to permit sliding rotary contact for wires inside the power cable 405. The slip ring system 455 may also be contained in an enclosure or protection box 456. The protection box 456 comprises an access door or lid (not shown) that may be opened to access the slip-ring system 455, such as to perform inspection and/or maintenance.

The PCR 410 may further include a rig digital system 411 communicatively connected with the MVFCD 420 and with the controller 470 of the moving side 490 via a communication cable 408 extending between the stationary side 480 and the moving side 490. The communication cable 408 may be connected with the PCR 410 via a connector assembly 409 at the PCR 410. The communication cable 408 may be stored on a spool 452, such as may permit the communication cable 408 to extend over the variable distance 415 as the moving side 490 moves away from the stationary side 480 (i.e., when the walking rig moves).

Spooling and unspooling of the power and communication cables 405, 408 onto and from the corresponding spools 450, 452 may be coordinated with (and/or ensure coordination of) the rig during walking operations, including rig movement in two perpendicular or otherwise different directions (e.g., in a first direction parallel to a North-South direction and a second direction parallel to a East-West direction). For example, the spooling and unspooling operations may be synchronized with the movement of the rig, such as to reduce or minimize axial loads (e.g., compression, tension) imparted to the cables 405, 408, permitting the rig to move (perhaps omnidirectionally) along the ground/wellsite pad.

When operating a medium-voltage power distribution system (e.g., the power distribution system 400), access to bare electrical components and connector assemblies (e.g., the connector assembly 406) may be limited when power is present, and multiple levels of protection may be implemented. For example, a locking handle (not shown) may be installed in association with the medium-voltage connector assembly 406. Such locking handle may utilize a lock and key assembly (i.e., an access interlock) mounted to or otherwise operatively connected in association with the connector assembly 406 in the PCR 410. The lock and key assembly may permit operation of the locking handle to disconnect the connector assembly 406 when the key is inserted. The locking handle may not be able to be locked, and the key may not be able to be removed from the lock, unless the connector assembly 406 is properly engaged. Thus, the lock and key assembly may assure proper engagement of the connector assembly 406 to permit the MVFCD 420 to activate the breaker 435 and permit power to be fed to the primary side of the medium-voltage transformer 430.

As another example, the lid of the protection box 407 may be equipped with a switch (not shown) to automatically detect the status of the lid. The switch may be communicatively connected to the MVFCD 420 and cause the MVFCD 420 to open the breaker 435 when the lid is open.

In another example, two pins (not shown) of the connector assembly 406 may be utilized to determine proper connection of the medium-voltage power cable 405. On the PCR side of the connector assembly 406, the pins may be monitored by the MVFCD 420 to determine a "detected" impedance (i.e., resistance). When the connector assembly 406 is properly engaged, the pins are shorted within a shell of the connector assembly 406 and the MVFCD determines that the connection is proper when the detected impedance is low. Then, the MVFCD 420 permits the breaker 435 to feed power to the transformer 430.

Another example pertains to the transformers 430, 460 on both extremities of the medium-voltage power cable 405 being three-phase transformers electrically connected in a "Y" configuration. The power cable 405 may comprise four conductors (three for the electrical phases and one for the "earth"). At the PCR 410, the isolation between the center of the Y connection and the earth may be monitored. If one or more phases of the cable 405 is not properly isolated from the earth, a current leakage may be established. Such current may be limited by a resistor 511 (shown in FIGS. 5 and 7) of the detection system. A measurement of the default current may be fed into the MVFCD 420, and if the default current is above a defined threshold, the MVFCD may reopen the breaker 435.

The moving side 490 may comprise one or more sensors operable to detect electrical faults associated with the power cable 405. If such sensors detect an electrical fault, information generated by the sensors and/or information indicative of the electrical fault may be transmitted by the communication cable 408 from the walking rig to the rig digital system 411 of the PCR 410, which may signal the MVFCD 420 to disconnect the breaker 435 to stop the transfer of electrical power from the stationary equipment to the walking rig. The moving side 490 may also comprise sensors operable to detect other faults, errors, malfunction, hazardous conditions, and/or other adverse occurrences associated with the rig and/or wellsite equipment. Information generated by such sensors and/or otherwise indicative of the adverse occurrence may be digitally transmitted via the communication cable 408 between the walking rig and the PCR 410 (e.g., to the rig digital system 411), which may digitally signal and/or otherwise be utilized to control rig and/or wellsite equipment in accordant response to the adverse occurrence, such as to open/close one or more electrical, hydraulic, mechanical, and/or other circuits of the rig and/or wellsite equipment, and/or to control one or more valves, switches, and/or actuators of the rig and/or wellsite equipment.

For example, the lid of the protection box 456 may be locked with a lock and key assembly (not shown) to selectively permit and prevent opening of the lid. The key may not be able to be used to open the protection box 456 unless the key has first been used to deactivate the MVFCD 420, such that after locking the protection box 456 the key may then be used to reactivate the MVFCD 420 and, thus, to permit the activation of the breaker 435 to feed power to the primary side of the medium-voltage transformer 430.

The lid of the protection box 456 may also or instead be equipped with a switch (not shown) to automatically detect the status of the lid. The status of the switch may be communicated to the MVFCD 420 via the communication cable 408. Thus, for example, as soon as the lid is opened, the MVFCD 420 may open the breaker 435. Furthermore, if the connector assembly 409 does not properly electrically connect the communication cable 408 with the rig digital system 411, the MVFCD 420 may determine that an anomaly in the lid switch is present, and thus cause the breaker 435 to open.

Although one connector assembly 406 is shown utilized along the medium-voltage power cable 405, additional connector assemblies may be utilized at the moving side 490 near the transformer 460. When utilized, the additional connector assemblies may be monitored similarly to the primary connector assembly 406 (e.g., mechanical lock and key assembly, plug connected verification, closed door on the box, etc.). Such electrical verifications may be facilitated by utilizing a copper pair (and/or other conductor(s)) of the communication cable 408.

Figure 5:
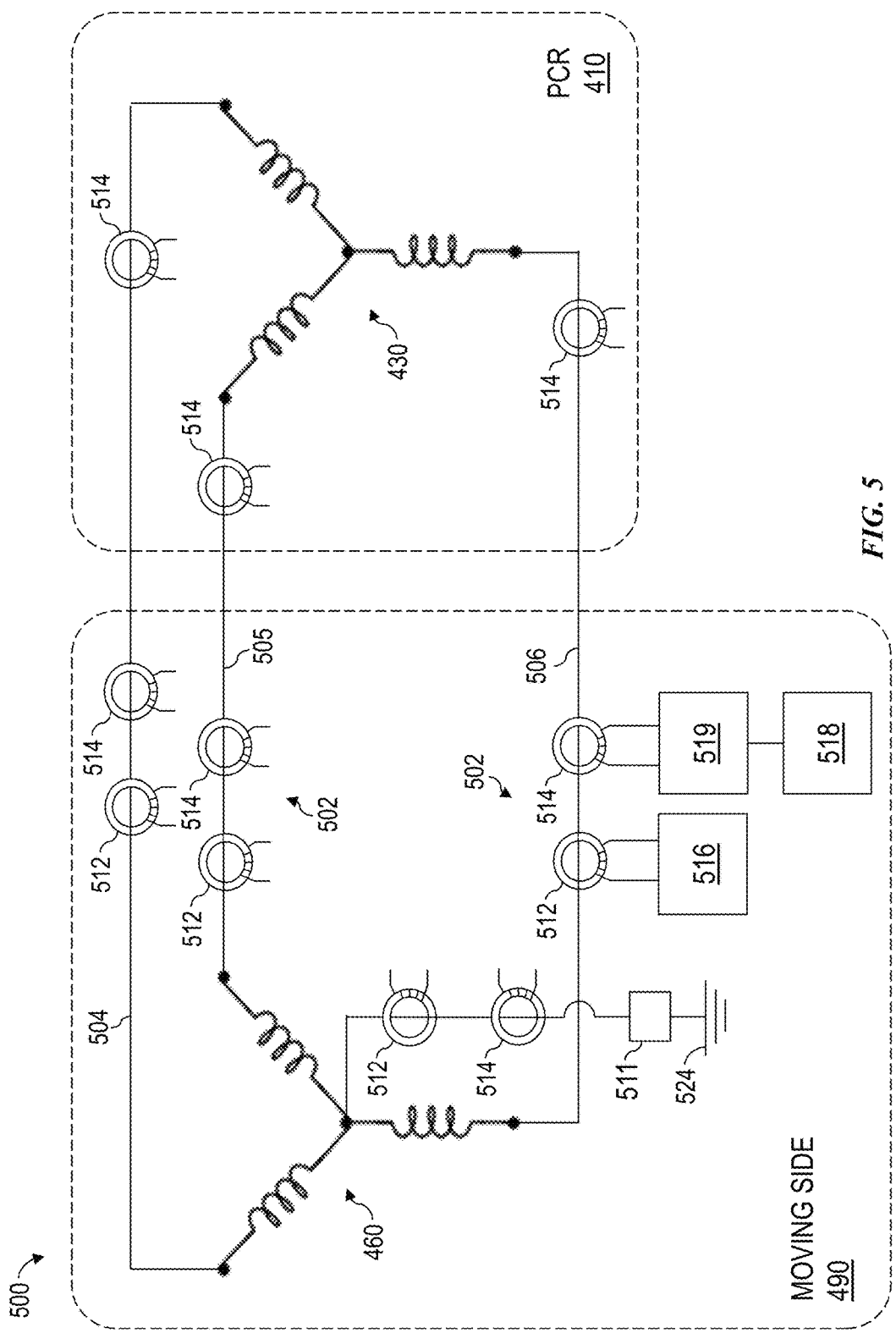
FIG. 5 is a schematic view of at least a portion of an example implementation of apparatus according to one or more aspects of the present disclosure.
Figure 6:
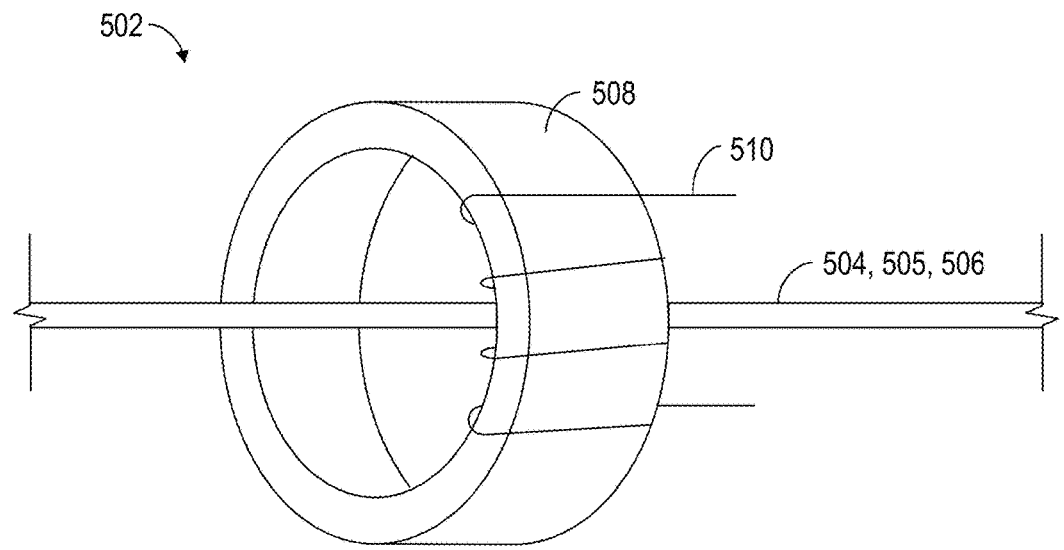
FIG. 6 is an enlarged view of a portion of the apparatus shown in FIG. 5 according to one or more aspects of the present disclosure.

Other fault detection systems may be utilized to insure that the connector assemblies 406 along the medium-voltage power cable 405 are properly engaged. FIG. 5 is a schematic view of at least a portion of a power transmission system 500 of the power distribution system 400 shown in FIG. 4 according to one or more aspects of the present disclosure. FIG. 5 shows several pairs of measurement transformers 502 that may be utilized to monitor each power wire 504, 505, 506 extending between the PCR 410 and the moving side 490 according to one or more aspects of the present disclosure. FIG. 6 shows an enlarged view of one of the measurement transformers 502 of toroid form, comprising a "donut" of ferromagnetic material 508 and a sensor wire wound around the ferromagnetic material 508 to form an electromagnetic coil or winding 510. One of the power wires 504, 505, 506 passes through the opening of the ferromagnetic material 508.

As described below, the measurement transformers 502 may operate as electromagnetic transmitters TX 512 and receivers RX 514. The measurement transformers 502 operating as the transmitters TX 512 may be electrically connected with corresponding signal generators 516 (just one shown) operable to inject (i.e., impart) a high frequency signal (e.g., electrical current) into the corresponding winding 510 to create an AC, high-frequency magnetic flux into the ferromagnetic material 508, which in turn injects an AC, high-frequency current into the corresponding power wire 504, 505, 506 if a loop exits for the power wire 504, 505, 506. The measurement transformers 502 operating as the receivers RX 514 may be operable to detect the high frequency current passing through the corresponding power wire 504, 505, 506. The current creates an AC flux in the ferromagnetic material 508 causing a voltage within the sensor winding 510. Each receiver RX 514 may be electrically connected with corresponding signal sensor 518 (just one shown) operable to detect and/or measure the voltage within the sensor winding 510. A signal filter 519 may be electrically connected between each receiver RX 514 and a corresponding signal sensor 518.

Figure 7:
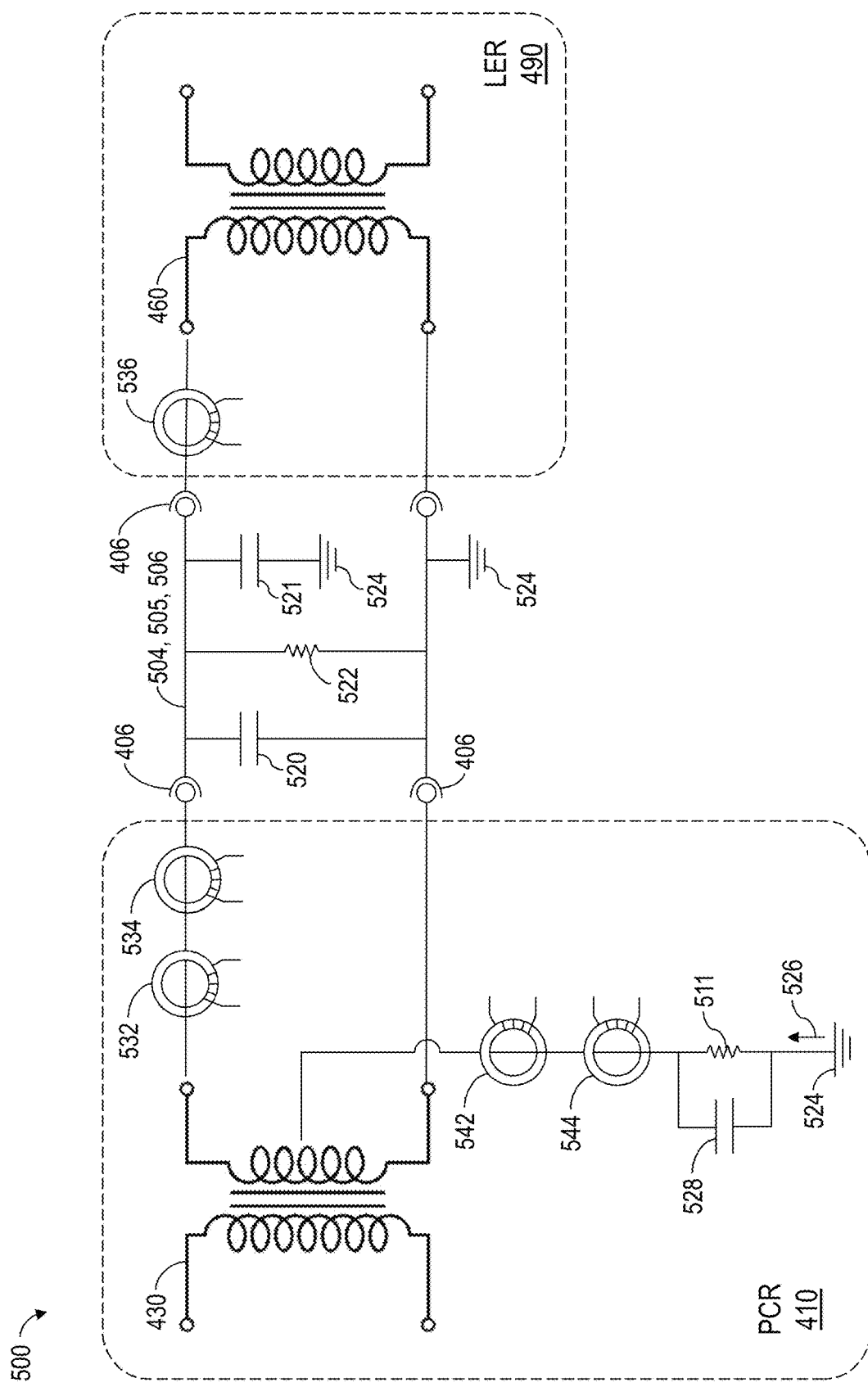
FIG. 7 is a schematic view of at least a portion of an example implementation of apparatus according to one or more aspects of the present disclosure.

FIG. 7 is a schematic view of one of the wires 504, 505, 506 (i.e., one phase) of the Y connections of the power transmission system 500 shown in FIG. 5 according to one or more aspects of the present disclosure. A loop exits via the power wire 504, 505, 506 through the power transformers 430, 460 when the medium-voltage power cable 405 is properly connected (i.e., the connectors assemblies 406 are properly engaged) to the transformers 430, 460. A capacitive coupling $C_C$ 520 between the power wire 504, 505, 506 may affect the impedance detected by each pair of transmitters $TX_L$ 532 and receivers $RX_L$ 534 (where subscript "L" indicates a local TX or RX). At high frequency, the presence of such capacitor $C_C$ 520 reduces the overall high frequency impedance of the power cable 405. The moving side 490 may also be equipped with a receiver $RX_R$ 536 (where subscript "R" indicates a remote RX) to monitor the current $I_{HF-R}$ passing through the receiver $RX_R$ 536 (i.e., amount of current $I_{HF-L}$ passing through the receiver $RX_L$ 514 that by-passed the capacitive effect $C_C$ 520 of the power cable 405). The measurement of the current $I_{HF-L}$ through the receiver $RX_R$ 536 permits determination of the total impedance at the PCR 410 end of the power cable 405. This includes the effect of the capacitance $C_C$ 520 and resistance $R_{isolation}$ 522. When the cable 405 is in good condition, then the resistance $R_{isolation}$ 522 is high. However, after sustaining damage, the resistance $R_{isolation}$ 522 may drop drastically. The wire 504, 505, 506 may be grounded 524 via a capacitor $C_{CG}$ 521. Also, the additional measurement performed by the receiver $RX_R$ 536 may permit confirmation of the impedance of the cable 405. The measurement performed by transmitter $TX_G$ 542 and receiver $RX_G$ 544 (where subscript "G" indicates ground) may permit monitoring of the current $I_{HF-G}$ 526, through the ground 524. The capacitor $C_G$ 528 permits reduction of the high frequency impedance to the ground 524. This makes the high-frequency ground current measurement more sensitive to the cable impedance (i.e., capacitance $C_C$ 520 and resistance $R_{isolation}$ 522).

Figure 8:
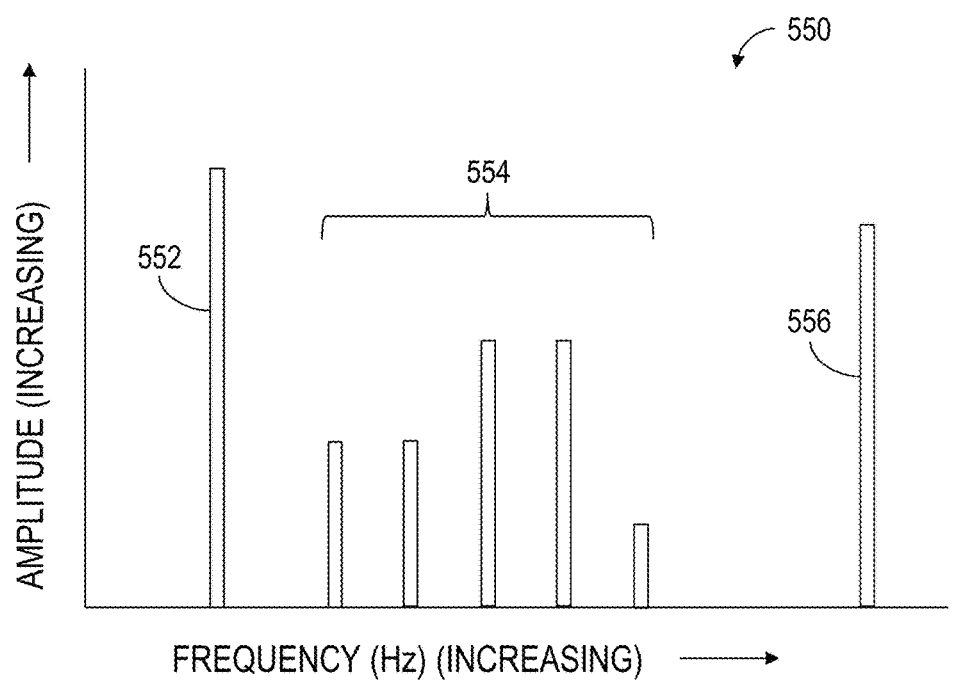
FIG. 8 is a graph related to one or more aspects of the present disclosure.

FIG. 8 is a graph 550 showing example frequencies detected by the receivers RX 514 installed at the PCR 410 extremity shown in FIG. 5. The graph 550 indicates presence of a wide range of frequencies detected via a plurality of bars indicative of frequency (shown along the horizontal axis) and amplitude (shown along the vertical axis) of the detected signals. A low frequency bar 552 is indicative of a base frequency generated by the generator 440. Noise may be added by a rectifier associated with a VFD at the moving side 490. Such noise is indicated in the graph 550 by mid-frequency bars 554. A high-frequency bar 556 is indicative of the high-frequency signal injected by the transmitters 512. At the measurement system, a proper filter (e.g., filter 519) separates the high-frequency, low-amplitude signal from the power current. This permits detection from being polluted by the rectifier noise.

The frequency measurement operations permit determination of impedance of the medium-voltage power cable 405, which permits determination of a quality status of the power cable 405. For example, the detected impedance of the medium-voltage power cable 405 may be indicative of an electrical fault associated with one or more of the wires 504, 505, 506 of the power cable 405. Comparing the three phases may also add a criteria for the quality status. The transmitters $TX_G$ 542 and receivers $TX_G$ 544 facilitate determination of the isolation impedance via the ground 524, which is additional information related to the quality status of the power cable 405.

Receivers $RX_{Li}$ 534 and $RX_{Ri}$ 536 associated with transmitters $TX_{Li}$ 532 (where subscript "i" indicates each phase 1, 2, and 3) may facilitate a more accurate "differential" determination of isolation resistance $R_{isolation\_i}$ 522 along the power cable 405 for each phase, perhaps with less influence of the transformer resistance. The current leakage along the medium-voltage cable 405 may be determined by the difference between the current measurements at receivers $RX_{Li}$ 534 and $RX_{Ri}$ 536.

Furthermore, the transmitters $TX_{Li}$ 532 and $TX_G$ 542 may be activated one at a time while measurements may be performed simultaneously by the receivers $RX_{Li}$ 534, $RX_{Ri}$ 536, and $RX_G$ 544. Such combination permits complete determination of capacitance $C_{C\_i}$ 520, $C_{CG\_i}$ 521, and resistance $R_{isolation\_i}$ 522 for the three phases, which may permit full determination of the power cable 405 impedance. Each transmitter $TX_{Li}$ 532 and $TX_G$ 542 may operate at a different frequency, such as if simultaneous measurement is performed. Thus, analysis may be performed for the different frequencies, which may permit simultaneous determination of the overall impedance.

The measurement sensors may be installed on the PCR 410 end so that power is available for the activation of the sensors even if the main breaker 435 is open. The receivers $RX_{Ri}$ 536 on the moving side 490 extremities may be powered via a low power, which may be fed via a pair of wires from the communication cable 408. The measurements performed by the receivers $RX_{Ri}$ 536 may be transmitted back to the PCR 480 via the communication cable 408, such that the MVFCD 420 may receive and process the measurements and generate a proper determination based on such measurements.

The measurement sensors TX 512 and RX 514 may include a ferromagnetic core that does not saturate under magnetic flux generated by the main phase wire (or the ground wire) when large phase AC current is present. Furthermore, detection of a low-amplitude, high-frequency signal while a high-amplitude, low-frequency signal is also present may be improved by coding the signal transmitted by the transmitters TX 512. The coding may be, for example, a sweep of frequency or digital coding. The reception at receivers RC may be performed after cross-correlation of the RC signal over the TX 512 signal.

When the power distribution system 400 is operated on land, the medium-voltage power cable 405 is laid on the ground, which exposes the cable 405 to traffic (e.g., people, forklifts, other vehicles) passing over the cable 405. Therefore, the cable 405 may be protected from mechanical damage that may be generated by such traffic. Depending on the application, such protection may be provided either locally (i.e., critical zone) or over the whole length of the cable 405. Local protection may include cable guards, trays, and/or bridges.

Figure 9:
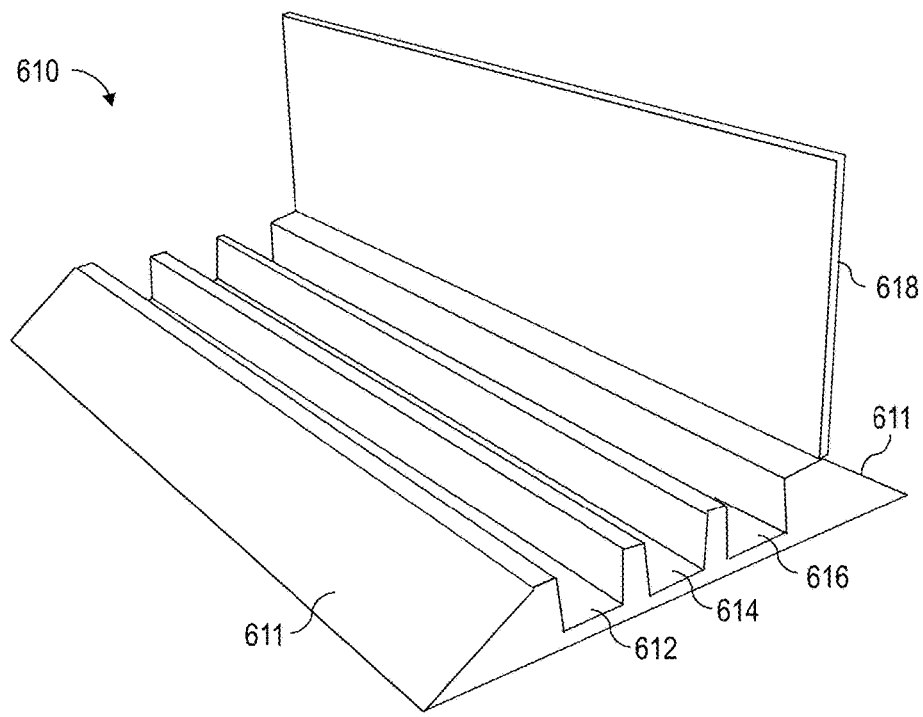
FIG. 9 is a schematic view of at least a portion of an example implementation of apparatus according to one or more aspects of the present disclosure.

FIG. 9 is a perspective view of at least a portion of an example cable guard 610 according to one or more aspects of the present disclosure. The cable guard 610 is configured to physically protect the medium-voltage power cable 405 and other cables and/or conduits from vehicular traffic, foot traffic, etc., while the cable 405 lies on the ground. The cable guard 610 may comprise a plurality of channels 612, 614, 616, each configured to receive therein a cable or conduit. The first channel 612 may receive the cable 405, the second channel 614 may receive the communication cable 408, and the third channel 616 may receive other conduits, such as hoses transmitting pressurized air or other fluids. The cable guard 610 may also comprise a movable cover 618 operable to selectively cover and expose the channels 612, 614, 616 and the cables and/or conduits disposed therein. Opposing sides of the cable guard 610 may comprise diagonal surfaces 611, which may accommodate or help vehicles to drive over the cable guard 610.

Figure 10:
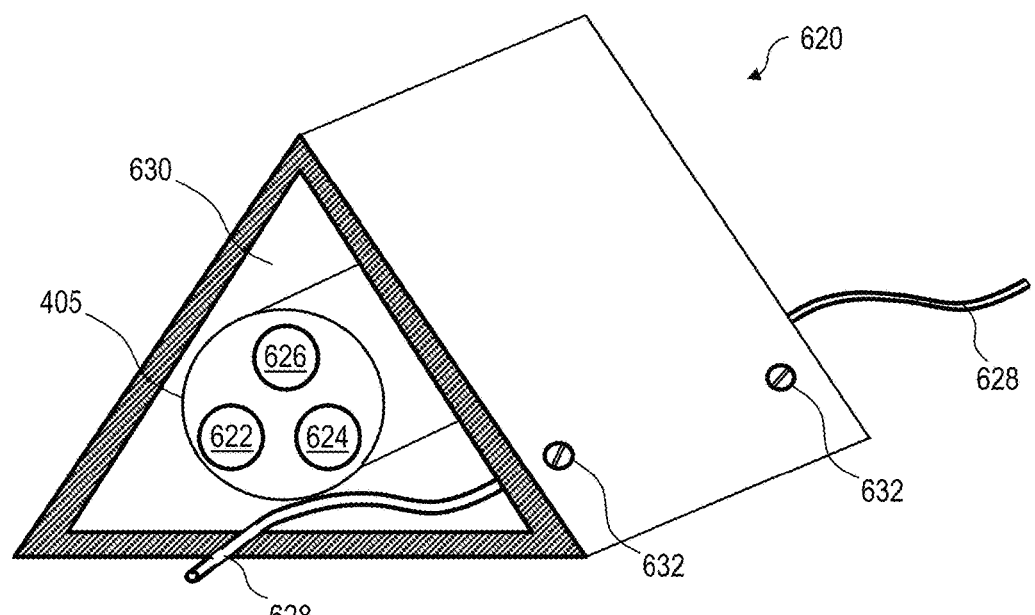
FIG. 10 is a schematic view of at least a portion of an example implementation of apparatus according to one or more aspects of the present disclosure.

FIG. 10 is a perspective view of at least a portion of another example cable guard 620 according to one or more aspects of the present disclosure. The cable guard 620 is configured to physically protect the medium-voltage power cable 405, such as from vehicular traffic, foot traffic, etc., while the cable lies on the ground. In some examples, the cable guard 620 may be formed of a metallic material, fiberglass, and/or another rigid materials. The power cable 405 illustrated in FIG. 4 may be formed with insulated conductors 622, 624, 626, such as stranded copper conductors, which are surrounded by a flexible insulating layer and/or material such as flexible plastic. Each of the conductors 622, 624, 626 of the power cable 405 may conduct one of the three-phase voltage generated at the stationary side, for example. Each of the conductors 622, 624, 626 of the power cable 405 may be and/or comprise an insulated copper conductor sized to carry 1,000 A or more at a voltage ranging between about 3,000 V and 4,160 V. However, the electrical voltage may be higher, such as, for example, 10,000 V.

The cable guard 620 is formed with a central passage 630 with an internal cross-sectional area that accommodates the power cable 405. The cable guard 620 may be formed in a generally triangular shape so that a lower surface (i.e., a base) thereof can rest on the ground while accommodating and supporting vehicular traffic on its upper surfaces. The cable guard 620 may be coupled, such as via a bolt and nut assembly 632, to an electrically conductive safety grounding link 628 (i.e., grounding conductor) that can be coupled to earth ground to provide a further level of safety for the power cable 405.

Figure 11:
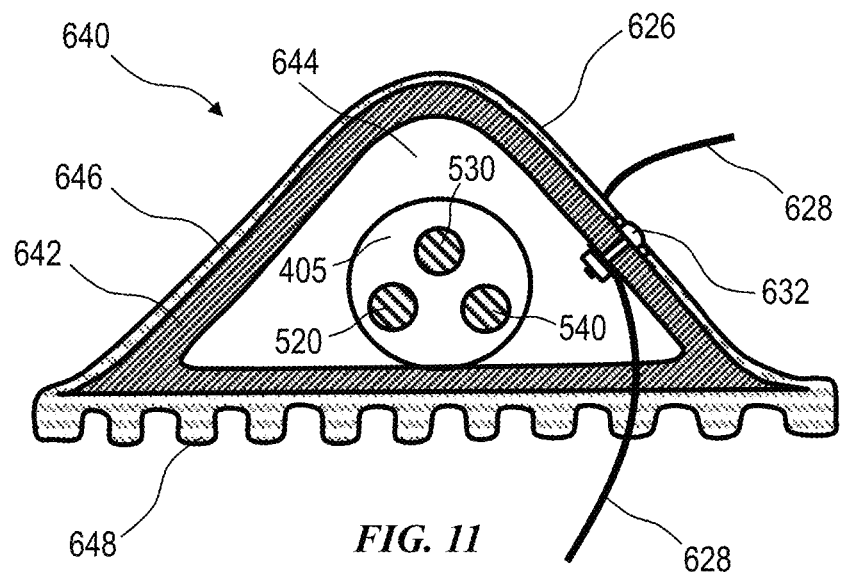
FIG. 11 is a schematic view of at least a portion of an example implementation of apparatus according to one or more aspects of the present disclosure.

FIG. 11 is a cross-sectional view of at least a portion of an example cable guard 640 according to one or more aspects of the present disclosure. The cable guard 640 includes a main body portion or housing 642. Inner surfaces of the housing 642 form a passage 644, which is substantially triangular in this example, through which the medium-voltage power cable 405 (including conductors 622, 624, 626) extends. The housing 642 therefore encloses the power cable 405 in the passage 644. The housing 642 may comprise a curved upper surface to reduce stress on one or more wellsite service vehicles that may be driven over the cable guard 640. The housing 642 of the cable guard 640 is of sufficient strength to support the weight of various wellsite service vehicles without collapsing onto the power cable 405. The housing 642 of the cable guard 640 may comprise or be aluminum, steel, fiberglass, and/or other example materials.

Although the housing 642 is described as being operable to support the weight of various wellsite service vehicles without collapsing onto the power cable 405, the housing 642 may be at least partially flexible or deformable (i.e., semi-rigid), such as may permit the cable guards 640 to flex or at least partially deform (e.g., bend along their longitudinal axes) as the power cable 405 with a plurality of the cable guards 640 disposed along its length is wound about a drum or spool. However, if the cable guards 640 comprise short axial lengths, the housings 642 of such cable guards 640 may comprise a substantially rigid constriction. The winding and unwinding operations of the power cable 405 are described below.

The cable guard 640 has an upper external covering 646 on upper exterior surfaces of the housing 642. The upper external covering 646 may be smooth or textured to prevent slippage by vehicles or personnel traversing over the cable guard 640. The cable guard 640 may further comprise a lower external covering 648 on a lower exterior surface of the housing 642, which may be textured (e.g., tread-shaped, grooved) to provide resistance (i.e., friction) to lateral displacement of the cable guard 640 across the ground. The upper external covering 646 and lower external covering 648 may be electrically insulating, such as by comprising or being a rubber, plastic, and/or other example insulating materials. The housing 642, which may be or include a metallic material, may be coupled to electrically conductive safety grounding link 628 via a bolt and nut assembly 632, such as to provide ground fault circuit interruption, for example.

Figure 12:
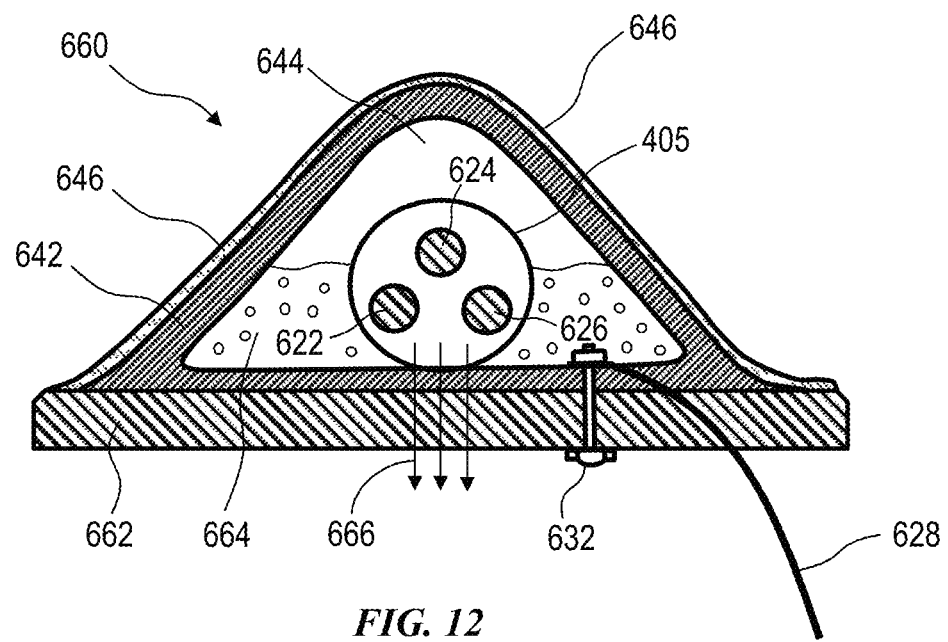
FIG. 12 is a schematic view of at least a portion of an example implementation of apparatus according to one or more aspects of the present disclosure.

FIG. 12 is a cross-sectional view of at least a portion of another example cable guard 660 according to one or more aspects of the present disclosure. The medium-voltage power cable 405 may be extended through the passage 644 of the cable guard 660 as described above. Similarly to the cable guard 640, the cable guard 660 comprises an upper housing 642 optimized for strength, such as to support vehicular traffic. However, the cable guard 660 also comprises a lower structure or base 662, which is optimized for strength and heat conduction between the internal passage 644 and external portions of the cable guard 660. For example, the base 662 may facilitate conduction or evacuation of heat generated by flow of current through the cable 405 to the ground. The base 662 may comprise a heat conductive material, such as a metal (e.g., bronze, aluminum, etc.). As the base 662 is also electrically conductive, the wire 628 and screw 632 may be connected with the base 662. The passage 644 (i.e., internal space) may be filled by a heat-conductive material 664 to increase heat conduction from the cable 405 to the base 662 and, thus, to the ground, as indicated by arrows 666. The material 664 may comprise a deformable material, such as rubber, silicon, RTV, etc., filled with a heat conductive material, such as glass, metal beads, etc. The material 664 may be selected to be either electrically conductive or electrically isolative, such as based on the amount of the deformable material utilized in the material 664. Whether the material 664 is electrically conductive may depend on the overall strategy of how to protect workers from the electrical power conducted via the cable 405. The cable 405 may also include a fourth conductor (not shown), such as a ground wire or an armored or electrical shield.

Figure 13:
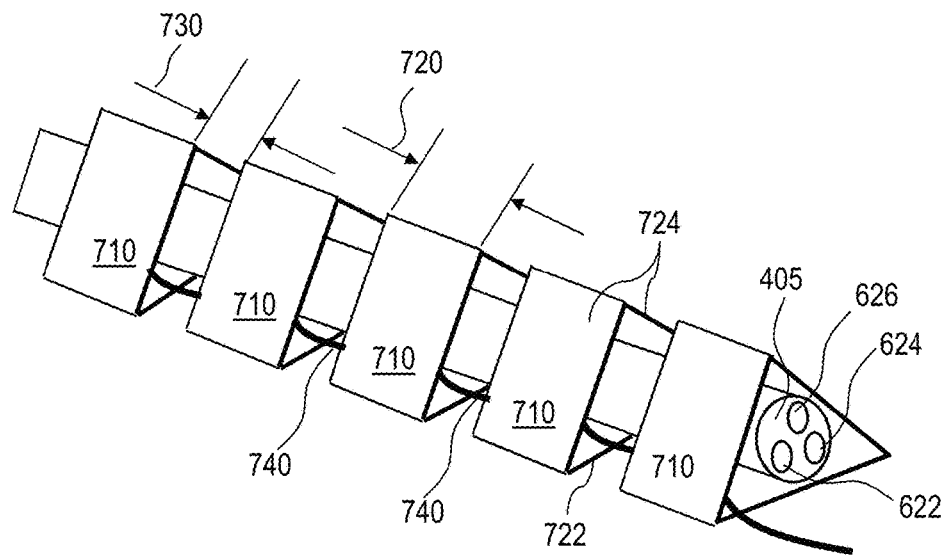
FIG. 13 is a schematic view of at least a portion of an example implementation of apparatus according to one or more aspects of the present disclosure.

FIG. 13 is a perspective view of multiple instances of cable guards 710 with the medium-voltage power cable 405 extending through the cable guards 710 according to one or more aspects of the present disclosure. Each of the cable guards 710 can be or include one or more aspects of the example cable guards 610, 620, 640, 660 described above. Each of the cable guards 710 has a width 720, which may be, for example, between about 10 centimeters (cm) and about 60 cm. The length of each cable guard 710 may be between about 15 cm and about 60 cm. As described above, shorter cable guards 710 may comprise a substantially rigid construction, while longer cable guards 710 may be deformable.

Neighboring ones of the cable guards 710 may be separated by a separation distance 730, which may be less than about 5 cm. Safety grounding links 740 may be connected between neighboring ones of the cable guards 710. Examples of safety grounding links 740 may include electrically conductive cables, electrically conductive chains, and/or other example electrically conductive links. The links 740 may impose the axial distances between successive cable guards 710. Different types of links 740 may be used between cable guards 710. One type of links 740 may be used for electrical purposes, while another type of links 740 may set mechanical position of the successive cable guards 710. Respective lengths of the safety grounding links 740 may be equal to or less than the separation distance 730. Different or the same separation distances 730 may be set between neighboring pairs of the cable guards 710, and different or the same lengths may be used for the safety grounding links 740. One or more of the safety grounding links 740, such as the safety grounding link 740 nearest to the stationary side, can be electrically coupled to a GFCD of the MVFCD 420 shown in FIG. 4, for detection of ground faults. By having multiple safety grounding links 740, flexibility of the power cable 405 may be accommodated, for example.

Figure 14:
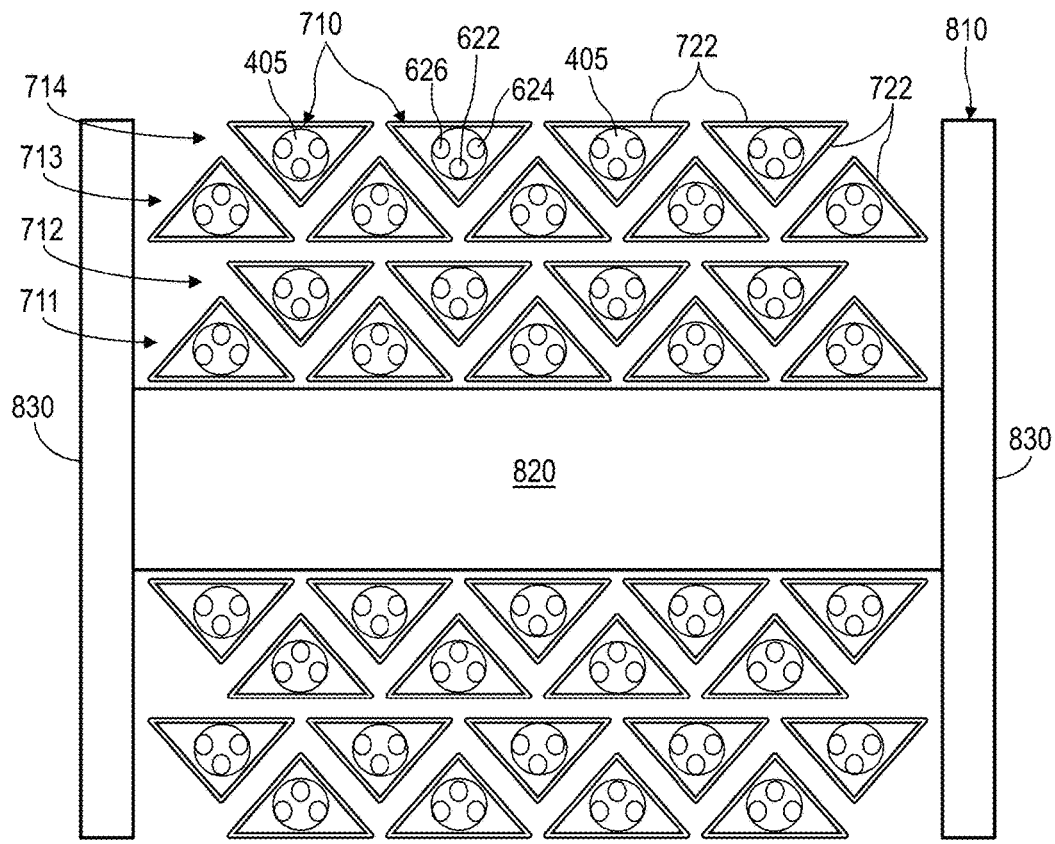
FIG. 14 is a schematic view of at least a portion of an example implementation of apparatus according to one or more aspects of the present disclosure.

FIG. 14 is a cross-sectional view of at least a portion of a spool 810 comprising the medium-voltage power cable 405 with the cable guards 710 at least partially wound around according to one or more aspects of the present disclosure. The spool 810 in some examples is mounted on a skid (e.g., skid 134 in FIGS. 1 and 2) of a local electrical room module of a well construction apparatus. The spool 810 includes a support cylinder 820 and lateral flanges 830 on opposing ends of the support cylinder 820. The power cable 405 is wound around the support cylinder 820 and between the lateral flanges 830. The power cable 405 extends through multiple instances of the cable guards 710, such as illustrated in and described with respect to FIG. 13, and hence, the cable guards 710 are also on the spool 810 when the power cable 405 is wound on the spool 810.

The power cable 405 may be wound onto the rotatable spool 810 forming successive layers 711, 712, 713, 714 of cable guards 710, wherein the cable guards 710 of each successive layer 711, 712, 713, 714 may be oriented in opposing directions. Each of the cable guards 710 may comprise a substantially triangular cross-section having a horizontal base 722 and laterally extending sides 724. Thus, when the power cable 405 is wound onto the rotatable spool 810, the cable guards 710 of each successive layer 711, 712, 713, 714 may be oriented in opposing directions such that the horizontal bases 722 and the laterally extending sides 724 of each successive layer 711, 712, 713, 714 abut.

In some examples, the cable guards 710 are not rigidly linked together or to the power cable 405. This can facilitate rotation of each cable guard 710 around the power cable 405 at least to some degree. The rotation of each cable guard 710 may permit cable guards 710 between adjoining rows on the spool 810 to fit together to permit a degree of compaction when the power cable 405 is wound on the spool 810. As an example, assuming that a cross section of each cable guard 710 is an equilateral triangle and that the power cable 405 is wound on the spool 810 in a first row on the support cylinder 820 and a subsequent second row adjoining the first row, one side of the cable guards 710 on the first row can lay flush along the support cylinder 820 at least along a line parallel to a longitudinal axis of the support cylinder 820 (e.g., due to the nature of a cylinder contacting respective substantially planar sides), and cable guards 710 on the second row could be rotated 60 degrees relative to the cable guards 710 on the first row such that the cable guards 710 in the second row could fit between cable guards 710 in the first row. This pattern can then be repeated for subsequent rows, such as what is illustrated in FIG. 14. In other examples, the cross sections of the cable guards 710 may be different from an equilateral triangle, and hence, rotation of cable guards 710 between different rows may vary. In some examples, the cable guards 710 are symmetrical to permit a degree of compaction on the spool 810, for example.

Figure 15:
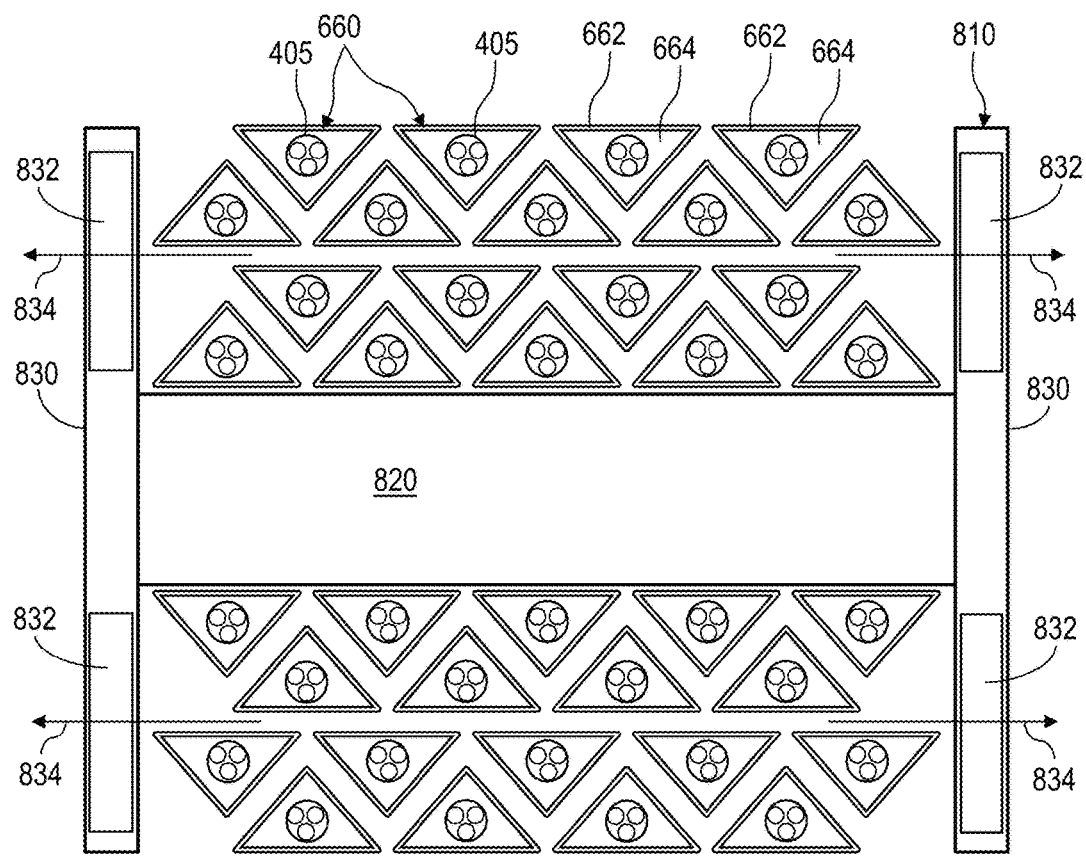
FIG. 15 is a schematic view of at least a portion of an example implementation of apparatus according to one or more aspects of the present disclosure.

FIG. 15 is another cross-sectional view of at least a portion of the spool 810 comprising the medium-voltage power cable 405 with the cable guards 660 at least partially wound around or "rolled" onto the support cylinder 820 of the spool 810 according to one or more aspects of the present disclosure. Similarly as when disposed on the ground, the cable guards 660 can also facilitate heat transfer from the cable 405 when rolled onto the spool 810. Between layers of the cable guards 660, the heat conductive bases 662 permit heat flow for the most inner portions of the power cable 405 laterally towards the lateral flanges 830 (i.e., rims) of the spool 810, as indicated by arrows 834. This lateral flanges 830 may comprise lateral openings 832, be substantially open, or otherwise permit heat transmission to the surrounding air even when multiple layers are on the spool 810. The cable guards 660 may be alternatively oriented with their bases 662 facing toward or away from the support cylinder 820, such as to reduce stacking height around the spool 810.

Figure 16:
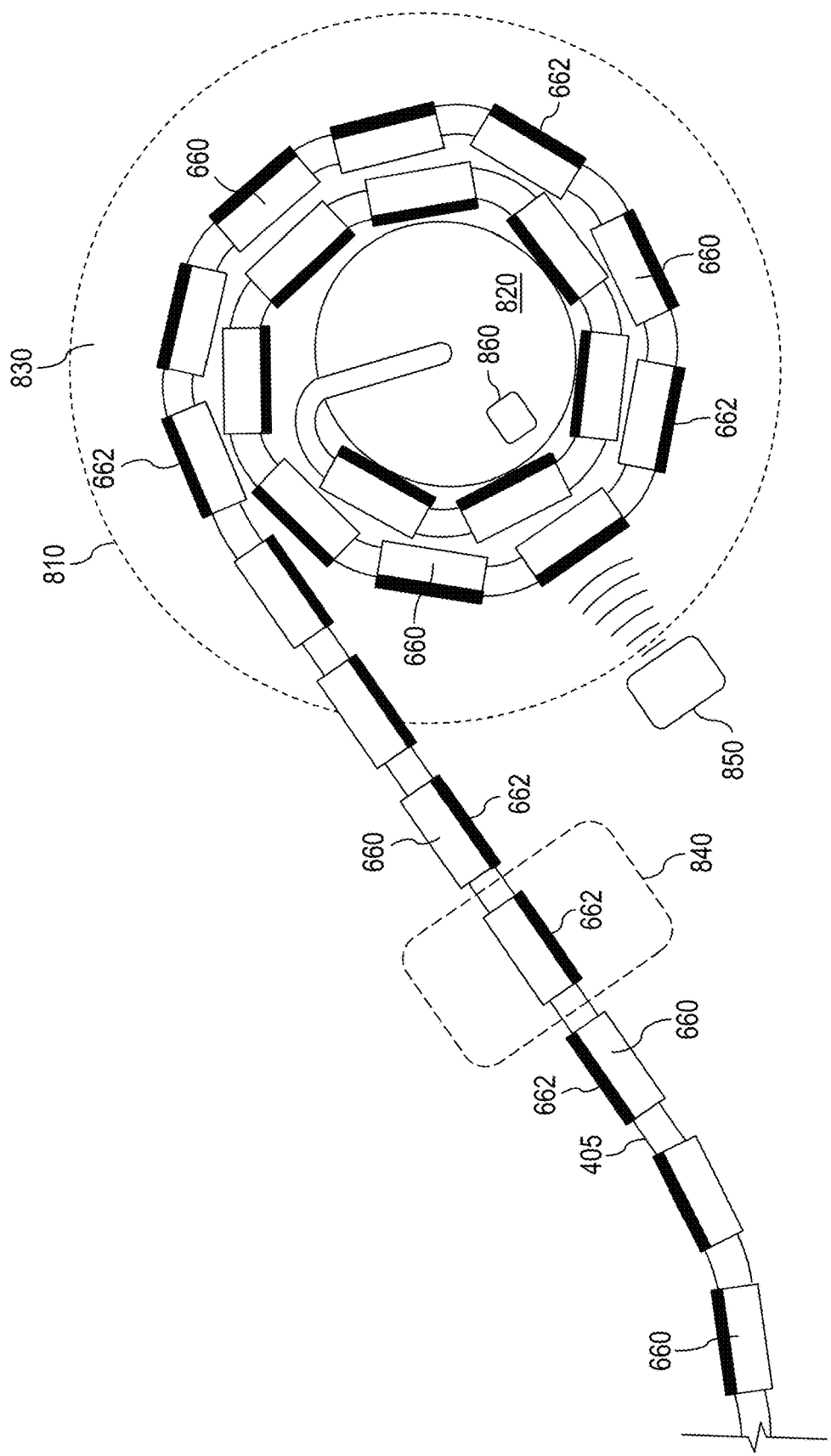
FIG. 16 is a schematic view of at least a portion of an example implementation of apparatus according to one or more aspects of the present disclosure.

FIG. 16 is a cross-sectional view of at least a portion of a guard orienting device 840 operable to rotate or otherwise orient the cable guards 660 (or other cable guards 710 within the scope of the present disclosure) such that the bases 662 are alternatingly facing toward or away from the support cylinder 820, depending on which layer of cable guards 660 is being wound onto the spool 810. During spooling operations, a detector 850 may track the orientation of the guards 660. Such detector 850 may be a video camera detecting color of the guards 660, and opposing sides of the guards 660 may be different colored. For example, the base 664 (i.e., the bottom side) may be metallic, while the external covering 646 (i.e., the top side) may be covered with a layer of rubber or plastic having a predetermined color (e.g., black rubber, white or light colored plastic). An additional sensor 860 may record rotation of the spool 830 to facilitate determination of movement and to determine an "end" of a given layer to cause the orienter 840 to flip or otherwise change the orientation of the cable guards 660. During unspooling of the cable 405, the guard orienter 840 may rotate the guards 660 such that the guards 660 are oriented with their bases 662 directed towards the ground.

Local protection may also provide electrical protection for people. For example, local cable protection may be provided by a local cable tray (not shown), which may comprise electrically insulating materials. The cable tray may be installed locally at walkways or vehicle paths coinciding with the cable 405 before power is transmitted by the cable 405. The cable trays may be heavy, such as may define a bridge for vehicles. Furthermore, fences and marking may also be installed to insure that the cable crossing by vehicles is performed where cable protection is provided.

Figure 17:
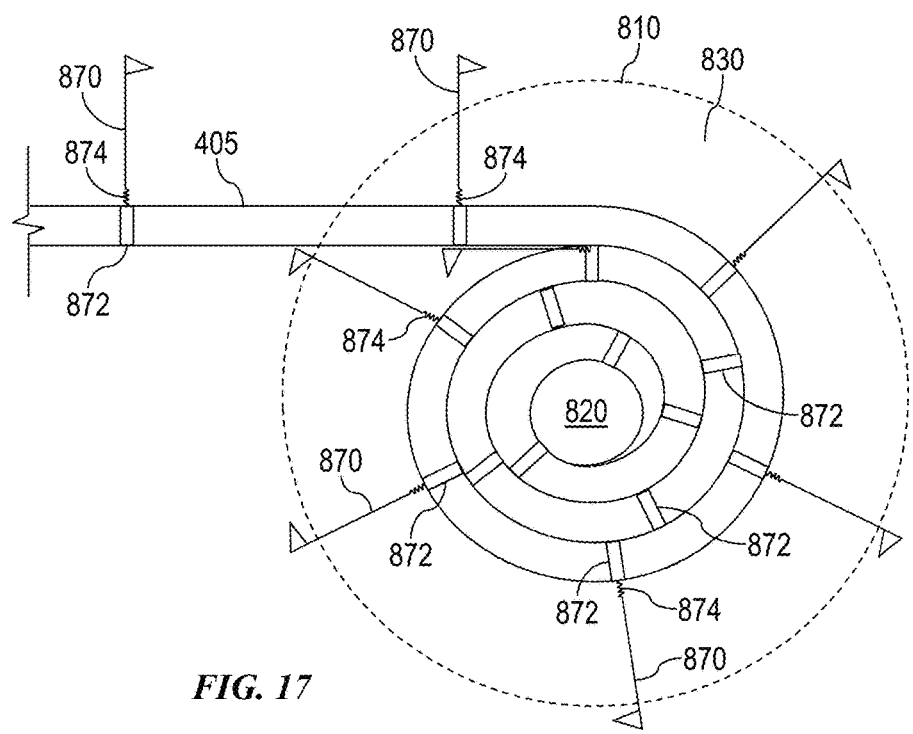
FIG. 17 is a schematic view of at least a portion of an example implementation of apparatus according to one or more aspects of the present disclosure.

The medium-voltage power cable 405 may also be equipped with flexible flags or other visual markers or indicators to identify or improve visibility of the cable 405. FIG. 17 is a side sectional view of an example implementation of the cable 405 wound about a support cylinder 820 of a cable spool 830 and having a plurality of flags 870 attached thereto according to one or more aspects of the present disclosure. The flags 870 may be attached to the cable 405 via corresponding clamps 872. Flexible connectors 874, such as springs, may be utilized to connect the flags 870 with the clamps 872. The flexible connectors 874 permit the flags to fold or bend sideways against the cable 405 as the cable 405 is wound onto the spool 830 and/or routed through a cable guard or tray or under a bridge (not shown).

Figure 18:
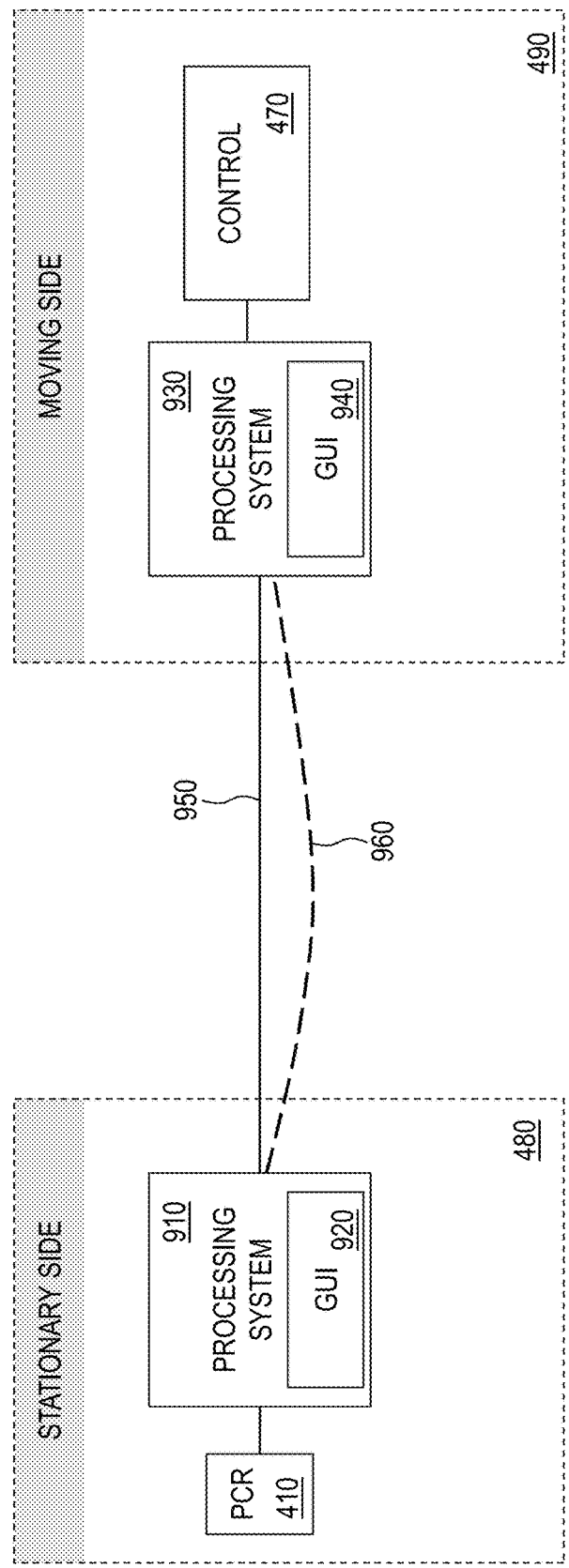
FIG. 18 is a schematic view of at least a portion of an example implementation of apparatus according to one or more aspects of the present disclosure.

FIG. 18 is a schematic view of a safety and/or security apparatus associated with a power distribution system according to one or more aspects of the present disclosure. The apparatus includes a processing system 910 with a graphical user interface (GUI) 920 at the stationary side 480 and a processing system 930 with a GUI 940 at the moving side 490. An example processing system is described in further detail below. The processing system 910 at the stationary side 480 is communicatively coupled to the processing system 930 at the moving side 490 via a communication cable 950 and/or wireless communication channel 960. The communication cable 950 may be integral to, attached to, or otherwise carried with the medium-voltage power cable 405, which may also be spooled on the power cable spool at the moving side 490. However, the communication cable 950 may be or comprise the communication cable 408 separate from the power cable 405 and wound on a separate spool 452, as described above and shown in FIG. 4. At the moving side 490, the control system 470 associated with the processing system 930 and GUI 940 may be powered from a local source of power and not via the cable 405, such as when power via the cable 405 in not established. Such local power may be provided independently via the communication cable 950 (e.g., low power based on 110 V or 220 V) or even from a UPS system, which may be changed when power is available (i.e., via the cable 405). In an example implementation of the power distribution system, the receivers (shown in FIG. 7) and the processing system 930 may be electrically powered via the local power source such that the MVFCD 420 can activate the one or more breakers 435 or relays.

Referring to FIGS. 4 and 18 together, the processing system 910 and one or more components in the PCR 410 operate in conjunction to control the opening and closing of a circuit breaker, switch, or other equipment that electrically couples the medium-voltage power cable 405 with a power source (e.g., the generator 440 and/or transformer 430) at the stationary side 480. In some examples, closing (and remaining closed) of the circuit breaker, switch, or other equipment at the stationary side 480 is dependent upon the processing system 910 having a message input by personnel at the stationary side 480 and receiving one or more messages from the processing system 930, which together can indicate that the power cable 405 is appropriately connected and ready to be energized.

As an example, personnel can unreel the power cable 405 from a spool of the moving side 490 and connect the power cable 405 to a connection at the stationary side 480. The connection at the stationary side 480 may be directly or indirectly to the circuit breaker, switch, or other equipment. Personnel at the stationary side 480 then input a message to the processing system 910, e.g., via the GUI 920. Personnel at the moving side 490 also input a message to the processing system 930, e.g., via the GUI 940, which is communicated to the processing system 910 at the stationary side 480, e.g., via the communication cable 950 and/or wireless communication channel 960. The processing system 910 then determines whether the messages input by personnel to the processing system 910 and received from the processing system 930 are authorized. If both messages are authorized, the processing system 910 at the stationary side 480 operates in conjunction with control components in the PCR 410 to permit closing of the circuit breaker, switch, or other equipment at the stationary side 480 to thereby energize the power cable 405 when the generator 440 and transformer 430 are operating.

The processing system 910 permits the medium-voltage power cable 405 to be electrically coupled to the power source when the messages are authorized, even though the circuit breaker, switch, or other equipment may remain open due to other control components in the PCR 410 prohibiting the power cable 405 from being electrically coupled to the power source due to other conditions not being met, faults occurring, and/or other circumstances. The processing system 910 prohibits the power cable 405 from being electrically coupled to the power source when the messages are not authorized. Furthermore, the MVFCD 420 determines if predetermined conditions are simultaneously present to engage the breaker 435. Such conditions may include status of the detectors and sensors and/or status of requests from the operators in the stationary side 480 and/or the moving side 490.

To determine whether the messages are authorized, the messages may be maintained in the processing system 910 by a protected administrative process providing controlled access by a designated operator. The messages may be encoded employing, for example, an Advanced Encryption System (AES) 256 encoding process and/or another encoding process. The protected administrative process may define a time period in which messages may be authorized, where outside of that time period, those messages will not be authorized (and hence, expired). The messages input by personnel to the processing system 910 and received from the processing system 930 can be compared to the messages maintained in the processing system 910 to identify when an input and/or received message matches a maintained message to thereby indicate that an authorized message has been input and/or received. If an input and/or received message does not match a maintained message, the input and/or received message is not authorized.

The communication of one or more messages between the processing systems 910 and 930 can use encryption. For example, the processing system 930 may encrypt and transmit one or more messages to the processing system 910 by employing a public key received by the processing system 930 from the processing system 910. Any encryption technique may be used.

The processing system 930 at the moving side 490 may continuously and/or repeatedly transmit one or more messages to the processing system 910 at the stationary side 480 to indicate that the medium-voltage power cable 405 should remain energized, such as based on proper operating conditions at the well construction apparatus. The continuous and/or repeated transmission may be at a predetermined time interval. Upon termination of the transmission of the message by the processing system 930 and/or upon exceeding a receipt time interval (which may be equal to or less than the predetermined time interval) from the time at which a previous message was received without receiving another message at the processing system 910, the processing system 910 at the stationary side 480 can cause the circuit breaker, switch, or other equipment at the stationary side 480 to open and de-couple the power cable 405 from the power source. The processing system 930 may terminate transmitting the message in response to an input, e.g., through the GUI 940, by personnel (e.g., an operator), and/or automatically in response to detected faults or hazards at the well construction apparatus, such as may be detected by the control 470.

Walking rigs prior to the present disclosure employ a festoon or other hanging cable arrangement for managing the electrical cabling to and from the stationary side (or static system) for power transmission, communication, control, and networking. However, such arrangements are quite bulky, and do not provide redundancy for power transmission, communication, control, networking, etc.

The present disclosure also introduces redundant power and communication cables, i.e., primary and secondary umbilicals each extending between the stationary side power (and perhaps control) source and the moving side of the movable well construction apparatus (also referred to herein as the movable system). The primary umbilical may be at the driller-side (DS), and the secondary umbilical may be at the off-driller side (ODS). With this additional electrical cabling, power transmission and control communication can be achieved via the primary or secondary umbilical.

Similar to aspects described above, the double umbilical system may be arranged for usage of a medium-voltage (e.g., 4,160 V AC) power cable at the main power transmission side (i.e., DS), and a lower-voltage (e.g., 600 V AC) power cable at the other side (i.e., ODS). The medium-voltage power cables are employed with a transformer on each end, as described below with reference to FIG. 19, for example. As also similar to aspects described above, spools may be used for ease of deployment of the primary and secondary umbilicals, as well as the communication cables, and the above-described examples for cable protection may be provided for each of the umbilicals described below so that, for example, vehicle traffic will not damage the cables.

A switching system (e.g., a double throw switch or breaker) permits independent selection of the primary or secondary power cables. Moreover, the secondary communication cable permits networking via a ring architecture, permitting access to each network from each node with high network reliability.

Additionally, a remote human machine interface (HMI) is provided to permit remote control if the primary umbilical is damaged and the rig floor may not be accessible (e.g., due to a gas leak or fire). Accordingly, well control and/or other rig operations may continue to be performed via the secondary umbilical(s) in the event the primary umbilical becomes damaged.

Drilling operations with walking rigs within the scope of the present disclosure may utilize a power level up to, without limitation, three megavolt-amperes (MVA) while transmitting power in medium-voltage range. Such power is used for operating the drawworks, top drive, iron roughneck, pipe handling equipment, and other components utilized during drilling. The power is also utilized for operation of other mechanized/automated devices of the walking rig, such as shakers, pumps, valves, chokes, and other components of the rig's walking drilling, well control, and other systems. The power is also utilized for controllers, networking devices, HMIs, and other computing devices, as well as heating, ventilation, and air conditioning systems on the rig. In these applications, the total power may be limited and the power may be transmitted in low-voltage power transfer.

The double umbilicals introduced herein provide redundancy for at least the more high-priority operations performed on the rig, such as well control and safety. For example, well control operations include managing circulation of mud within the wellbore, including the control of the mud pumps at the stationary side, control of components at the movable side such as transfer pumps, valves, gas separators, and other components of the mud circulation/cleaning systems, and control of the blowout preventer (BOP), chokes, and other protective devices. That is, if the main power between the stationary side and the movable rig is cut, these functions would no longer be able to be performed at the movable side, leaving the well in a dangerous condition. Also, if the communication cable is damaged, it may be impossible to control these components, because the communication cable may include a network cable and an emergency stop (ES) cable, and may also transmit important sensor information.

To assure management of such conditions, the present disclosure introduces aspects pertaining to utilizing a secondary umbilical for power, and perhaps also for communication. The secondary power umbilical may provide the same power as the primary power umbilical, or it may just provide enough power for some operations (e.g., well control), and perhaps full or reduced communication capabilities. For example, drilling operations sustainable via power from the primary power umbilical may not be sustainable when power is transmitted via the secondary umbilical. In such implementations, the transformers described above for use with the medium-voltage power cable may not exist for the secondary, low-voltage umbilical, such as when the low-voltage is 600 V, and the secondary power cable may feed power in a range of just about 300 horsepower.

The redundant communication cable may be part of the secondary power cable, or may be a secondary communication cable. Either case permits a ring network topology with full access of the network nodes from each node of the ring, such that the overall network may be quite fault tolerant for cable or node faults. Also, if the DS system experiences a problem, some control may still be performed via the secondary HMI that is remote from the DCR. The remote HMI may be located in the PCR, at the control station of the mud system at the stationary side, in a driller office, or other locations.

Additionally, the redundant umbilicals may be utilized with the same spools and cabling at each end. This permits swapping of a component for ease of maintenance and increases capability for fast repair, while reducing equipment inventory.

Figure 19:
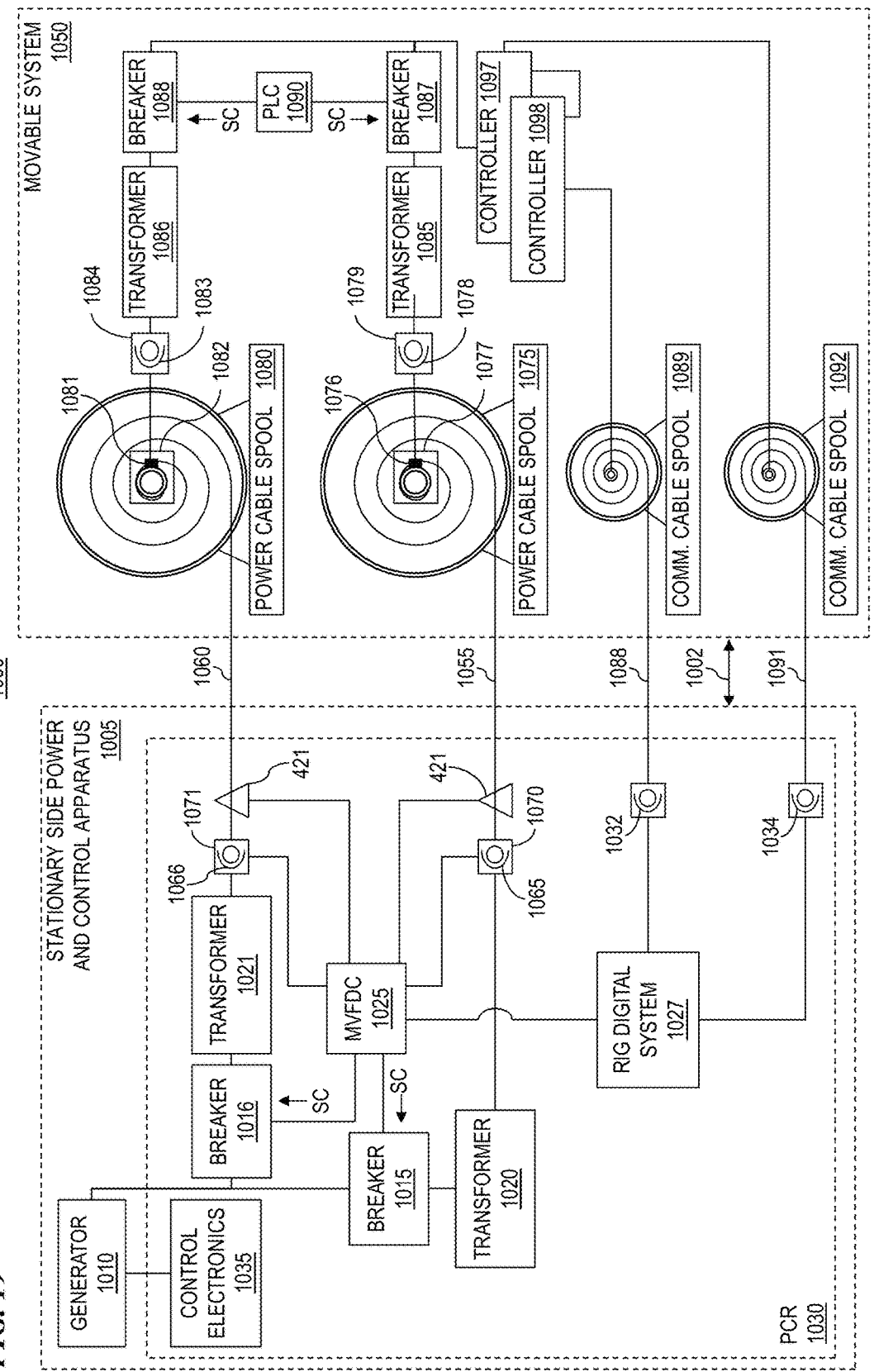
FIG. 19 is a schematic view of at least a portion of an example implementation of apparatus according to one or more aspects of the present disclosure.

FIG. 19 is a schematic view of at least a portion of an example implementation of a power distribution system 1000 at a wellsite for a well construction apparatus which is capable of moving, e.g., by "walking," according to one or more aspects of the present disclosure. The power distribution system 1000 is similar to the power distribution system 400 of FIG. 4 including the related description and figures (see, e.g., FIGS. 5-7). However, the power distribution system 1000 shown in FIG. 19 includes the redundant power and communication umbilicals introduced above, including a primary electrical power cable (also referred to as a primary power cable) 1055, a secondary electrical power cable (also referred to as a secondary power cable) 1060, a primary communication cable 1088, and a secondary communication cable 1091, each extending between a stationary side power and control apparatus 1005 and a movable system 1050. In other implementations within the scope of the present disclosure, the primary power cable 1055 and the primary communication cable 1088 may be part of the same umbilical, and/or the secondary power cable 1060 and the secondary communication cable 1091 may be part of the same umbilical. The stationary side power and control apparatus 1005 and the movable system 1050 are analogous to the stationary side power and control apparatus 480 and the moving side 490 described above, except as described herein. The communication cables may include electrical medium and/or fiber optic medium, and can accommodate data (including measurements), control signaling, and/or alarms, among other examples. Additionally, it is contemplated that a power cable can also accommodate a communication medium (such as fiber optic) within the same jacket.

At the stationary side 1005, one or more generators 1010 that produce a three-phase AC voltage, such as 600 V AC, are coupled to transformers 1020, 1021 that step up the AC voltage, such as to 4,160 V. One or more power breakers 1015, 1016 are installed between the generator 1010 and the corresponding transformers 1020, 1021. An MVFCD 1025 monitors the power cables 1055, 1060 on the stationary side, such as via sensors 421 as described above. Two independent MVFCDs may also be used, one per medium voltage (e.g., 4,160 V) cable. Upon detecting one or more faults associated with power cables 1055, 1060, the MVFCD 1025 may send control signals (generally designated "SC") to the breakers 1015, 1016 to select the other power cable to continue operations, thus switching the medium-voltage application between the primary power cable 1055 and the secondary power cable 1060, or vice versa. The breakers 1015, 1016 may also be closed together for simultaneous power feeding via both the power cables 1055, 1060. Thus, the breakers 1055, 1060 activate or deactivate the power transmission based on control signals. The term "breaker" as used herein is a device capable of activating or deactivating, selecting or de-selecting, and/or otherwise permitting or preventing the power transmission over a power medium, including devices conventionally referred to by terms other than "breaker."

The PCR 1030 is the same as the PCR 410 described above, with possible exceptions as described herein. A PCR 1030 may include components (e.g., PLCs) that control and/or protect the generator 1010 and transformers 1020, 1021, for example. Additionally, the PCR 1010 may include control electronics 1035 and/or other components that control and/or facilitate bringing one or more of the generators 1010 online in the power distribution system 1000, such as by monitoring the voltage, phase, and/or frequency of the power generated by the one or more generators 1010 relative to power being distributed by the power distribution system 1000. The MVFCD 1025 may include components that detect ground faults proximate the transformers 1020, 1021, such as on an output node thereof. If a fault is detected by a GFCD of the MVFCD 1025, the MVFCD 1025 can control the breakers 1015, 1016, switches, and/or other components to remove power feeding into the transformers 1020, 1021 associated with a fault.

The primary and secondary power cables 1055, 1060 may be equipped with at least a portion of connector assemblies 1065, 1066 operable to selectively and electrically connect the power cables 1055, 1060, respectively, with the transformers 1020, 1021. The connector assemblies 1065, 1066 may be contained in corresponding enclosures or protection boxes 1070, 1071 at the PCR 1030. The protection boxes 1070, 1071 may be the same or similar to the protection boxes described above. For example, each protection box 1070, 1071 may comprise a door or lid (not shown) that may be opened to permit access to the connector assemblies 1065, 1066, such as for connecting and disconnecting the connector assemblies 1065, 1066. The power cables 1055, 1060 conduct AC power from the stationary side 1005 (e.g., from the transformers 1020, 1021 and/or PCR 1030) over a variable distance 1002 to the movable system 1050.

A primary power cable spool or reel 1075 and a secondary power cable spool or reel 1080 are mounted on the movable system 1050. The primary and secondary cable spools 1075, 1080 are capable of reeling in and out and at least partially supporting the primary and second power cables 1055, 1060, respectively. The primary and second power cables 1055, 1060, as terminated at the primary and secondary cable spools 1075, 1080, are electrically coupled to corresponding transformers 1085, 1086 that are located at the movable system 1050 and operable to step down the voltage supplied from the primary and secondary power cables 1055, 1060, such as to 600 V AC. The lower voltage, e.g., 600 V AC, may be supplied as a power source voltage to power controllers 1097, 1098 of the movable well construction apparatus 1050, as well as the top drive, drawworks, and/or other components and equipment of the rig (not shown in FIG. 19 but depicted in other figures).

The primary power cable spool 1075 is equipped with a slip-ring system 1076 to permit sliding rotary contact for wires inside the primary power cable 1055. The slip ring system 1076 may be contained in an enclosure or protection box 1077 that is the same or similar to the protection boxes described above. For example, the protection box 1077 may comprise an access door or lid (not shown) that may be opened for accessing the slip-ring system 1076, such as for performing inspection and/or maintenance. The secondary power cable spool 1080 is likewise equipped with a slip-ring system 1081, perhaps also within a similar protection box 1082.

The primary and secondary power cables 1055, 1060 may be equipped with at least a portion of connector assemblies 1078, 1083 to electrically connect the power cables 1055, 1060, respectively, with the transformers 1085, 1086. The connector assemblies 1078, 1083 may also be contained in enclosures or protection boxes 1079, 1084 that are the same or similar to the protection boxes described above. For example, the protection boxes 1079, 1084 may each comprise a door or lid (not shown) that may be opened to permit access to the connector assembly 1083, such as for connecting and disconnecting the connector assemblies 1078, 1083.

The transformers 1085, 1086 are connected to breakers 1087, 1088 that can be activated by applying control signals (generally designated "SC") from, for example, a PLC 1090 within the movable system 1050. The PLC 1090 may act autonomously or in connection with the controllers 1097, 1098 coupled to the MVFDC 1025 via a rig digital system 1027 over the communication cables 1088, 1091. The breakers may also be controlled by offsite controllers.

The PCR 1030 may further include the rig digital system 1027, which may be the same as the rig digital system 411 described above with possible exceptions described below. The rig digital system 1027 is communicatively connected with the MVFCD 1025 (or potentially two MVCFDs, one per cable) and with the controllers 1097, 1098 of the movable system 1050 via the primary communication cable 1088 and the secondary communication cable 1091. The communication cables 1088, 1091 may be connected with the PCR 1030 via corresponding connector assemblies 1032, 1034. In essence, the communication cables 1088, 1091 form a part of a ring network between the digital system 1027 in the PCR 1030 and the controllers 1097, 1098 in the movable system 1050. Some implementations may include more digital nodes and PLCs or controllers in the ring network.

The primary and second communication cables 1088, 1091 may be stored on respective primary and secondary spools 1089, 1092 on the movable system 1050, such as may permit the communication cables 1088, 1091 to extend over the variable distance 1002 as the movable system 1050 moves away from the stationary side 1005 (i.e., when the walking rig moves). The primary and second communication cables 1088, 1091 are coupled to the corresponding controllers 1097, 1098, which are also coupled together as shown.

Within the power distribution system 1000, access to bare electrical components and connector assemblies (e.g., the connector assembly 1065) may be limited when power is present, and multiple levels of protection may be implemented. For example, a locking handle (not shown) may be installed in association with the connector assembly 1065. Such locking handle may utilize a lock and key assembly (i.e., an access interlock) mounted to or otherwise operatively connected in association with the connector assembly 1065 in the PCR 1030. The lock and key assembly may permit operation of the locking handle to disconnect the connector assembly 1065 when the key is inserted. Furthermore, the handle may not be able to be locked, and the key may not be able to be removed from the lock, unless the connector assembly 1065 is properly engaged. Thus, the lock and key assembly may assure proper engagement of the connector assembly 1065 to permit the MVFCD 1025 to activate the breaker 1015 and permit power to be fed to the primary side of the medium-voltage transformer 1020. Similar protection may be applied to the other connector assemblies 1066, 1078, 1083 and/or the slip-ring systems 1076, 1081.

As another example, the lid of each protection box 1070, 1071, 1079, 1084 may be equipped with a switch (not shown) to automatically detect the status of the lid. The switch may be communicatively connected to the MVFCD 1025 and cause the MVFCD 1025 to open the corresponding breaker 1015, 1016, 1087, 1088 when the lid is open. Similar protection may be applied to the slip-ring systems 1076, 1081.

In another example, two pins (not shown) of each connector assembly 1065, 1066, 1078, 1083 may be utilized to determine proper connection of the corresponding power cables 1055, 1060. The pins may be monitored by the MVFCD 1025 to determine a "detected" impedance (i.e., resistance). When the connector assembly 1065, 1066, 1078, 1083 is properly engaged, the pins are shorted within a shell of that connector assembly, and the MVFCD 1025 may determine that the corresponding connection is proper when the detected impedance is low. Then, the MVFCD 1065 permits the corresponding breaker 1015, 1016, 1087, 1088 to feed power to the corresponding transformer 1020, 1021, 1085, 1086.

Another example pertains to the transformers 1020, 1085 on both extremities of the power cable 1055, and/or the transformers 1021, 1086 on both extremities of the power cable 1060, being three-phase transformers electrically connected in a "Y" configuration. One or both power cables 1055, 1060 may comprise four conductors (three for the electrical phases and one for the "earth"). At the PCR 1030, the isolation between the center of the Y connection and the earth may be monitored. If one or more phases of the cables 1055, 1060 are not properly isolated from the earth, a current leakage may be established. Such current may be limited by a resistor of the detection system (such as the resistor 511 shown in FIGS. 5 and 7). A measurement of the default current may be fed into the MVFCD 1025, and if the default current is above a defined threshold, the MVFCD may reopen the corresponding breaker.

As described above, one or more of the protection boxes 1077, 1082, 1079, 1084 may be equipped with a switch (not shown) to automatically detect the status of the corresponding lid. The status of the switch may be communicated to the MVFCD 1025 via the communication cables 1088, 1091. Thus, for example, as soon as the lid is opened, the MVFCD 1025 may open the corresponding breaker 1015, 1016. Furthermore, if one of the connector assemblies 1032, 1034 does not properly electrically connect the communication cables 1088, 1091, the rig digital system 1027 may organize the data transfer by the working data path. If no data path may be established successfully, then the rig digital system 1027 informs the MVFCD 1025 that an anomaly in the lid switch is present, and thus causes the corresponding breaker 1015, 1016 to open.

As described above, the power distribution system 1000 may include two 4,160 V power cables and respective communication cables, also referred to herein as umbilicals. In other words, a primary power cable/umbilical and a secondary power cable/umbilical may be employed to provide redundant power for the movable system 1050. The existence of the secondary power cable 1060 may mitigate the risk of the primary power cable 1055 malfunctioning or otherwise being unavailable. The primary and secondary power cables 1055, 1060 may be individually selectively switched to provide power for the movable system 1050. Similarly, the primary and secondary communication cables 1088, 1091 may provide information between the stationary side power and control apparatus 1005 and the movable system 1050. The communication cables 1088, 1091 are coupled to the controllers 1097, 1098 in the movable system 1050 to form a redundant network. In some implementations, additional controllers or PLCs may also be included in the ring network. The double power cable structure provides a ring power network architecture, and the double communication cable structure provides a ring communication network architecture.

Figure 20:
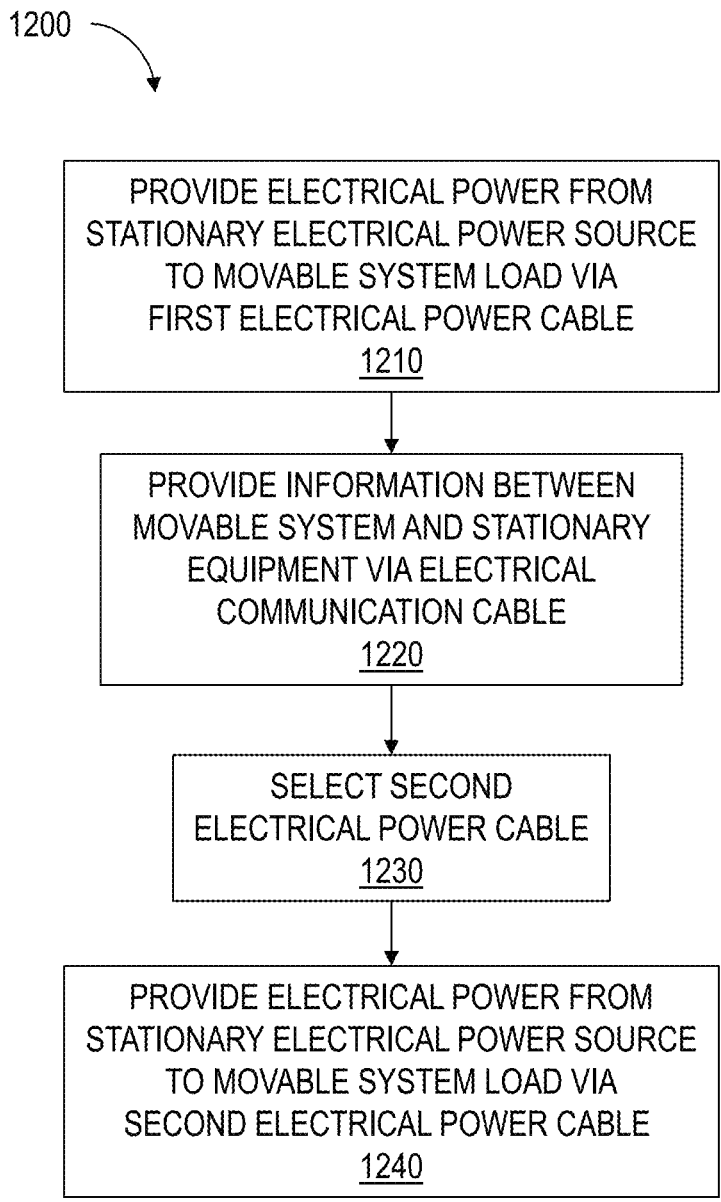
FIG. 20 is a flow-chart diagram of at least a portion of an example implementation of a method according to one or more aspects of the present disclosure.

FIG. 20 is a flow-chart diagram of at least a portion of an example implementation of a method (1200) according to one or more aspects of the present disclosure. The method (1200) may be performed at a well construction wellsite as depicted in FIG. 19, and thus is described below in reference to FIG. 19.

The method (1200) includes providing (1210) electrical power from the stationary side power and control apparatus 1005 to the movable system 1050 via the first electrical power cable 1055. The electrical power may be stepped up from a first voltage (e.g., 600 V AC) to a second voltage (e.g., 4,160 V AC) for transmission over the first electrical power cable 1055.

The method (1200) also includes providing (1220) information between the movable system 1050 and the stationary side power and control apparatus 1005 via the first and/or second communication cables 1088, 1091. The information may be indicative of an electrical fault associated with the first electrical power cable 1055.

The method (1200) also includes selecting (1230) the second electrical power cable 1060. The selection (1230) of the second electrical power cable is based on the provided (1220) information, such as information indicative of an electrical fault associated with the first electrical power cable 1055 and/or other information. As a non-limiting time duration, the switch (1230) to the second electrical power cable 1060 may be completed within one second (or perhaps fifty milliseconds or less) of a situation sensed or detected by one or more sensors and described or otherwise associated with the provided (1220) information, such as within one second (or perhaps fifty milliseconds or less) of the detection of the electrical fault with respect to the first electrical power cable 1055. Thus, for example, if an emergency situation is associated with the first electrical power cable 1055 being energized, then the first electrical power cable 1055 can be quickly de-energized to remedy the emergency, but high-priority operations (and perhaps also others) on the rig can continue via power supplied by the second electrical power cable 1060. Of course, one second (or fifty milliseconds or less) is just one example of the possible time periods between the detection of an event necessitating switching and the actual subsequent switching. Moreover, other information in lieu of or in addition to the electrical fault may be used to describe the health of the first power cable 1055 and/or other situations necessitating switching (1230) to the second power cable 1060.

The method 1200 also includes providing (1240) electrical power from the stationary electrical power source to the load via the second electrical power cable 1060. The provided (1240) electrical power may power the same or fewer wellsite operations that were being performed with power provided (1210) by the first power cable 1055. That is, the wellsite operations before and after the switch (1230) to the second electrical power cable 1060 may be the same including, without limitation, drilling operations and well control operations. Conversely, the wellsite operations before and after the switch (1230) to the second electrical power cable 1060 may be different, such as drilling operations and well control operations being performed before the switch (1230), but just well control operations thereafter. Thus, the power over the first and second electrical power cables 1055, 1060 may be at first and second different voltages, respectively, supporting different wellsite operations.

Figure 21:
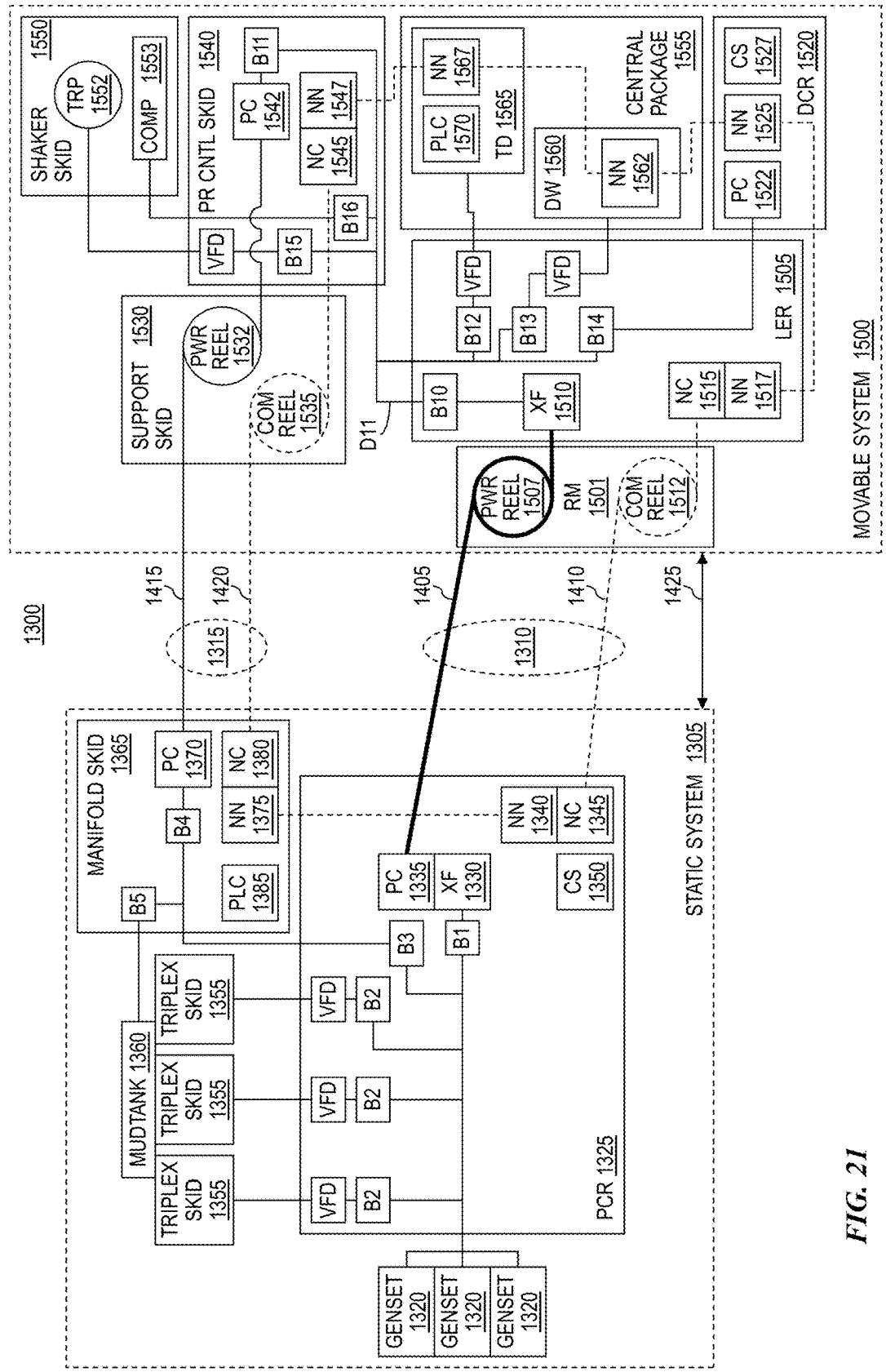
FIG. 21 is a schematic view of at least a portion of an example implementation of apparatus according to one or more aspects of the present disclosure.

FIG. 21 is a schematic view of at least a portion of an example implementation of a power distribution system 1300 at a wellsite for a well construction apparatus that is capable of moving, e.g., by "walking," according to one or more aspects of the present disclosure. The power distribution system 1300 is similar to the power distribution system 400 of FIG. 4 including the related description and figures (see, e.g., FIGS. 5-7) and the power distribution system 1000 of FIG. 19 including the related description. The power distribution system 1300 shown in FIG. 21 includes redundant power and communication umbilicals including a primary umbilical 1310 bounding a primary electrical power cable 1405 and a primary communication cable 1410, and a secondary umbilical 1315 bounding a secondary electrical power cable 1415 and a secondary communication cable 1420. Each umbilical 1310, 1315 extends a variable distance 1425 between a static system (also referred to as a stationary equipment) 1305 and a movable system (also referred to as a movable well construction apparatus) 1500 at the wellsite.

The primary and secondary electrical power cables 1405, 1415 may be generally constructed as three-phase cables that may include neutral and safety ground wires. The primary and secondary electrical power cable cables 1405, 1415 may be formed with plural conductors electrically coupled in parallel to provide sufficient flexibility for coiling on power (PWR) reels 1507, 1532. By locating the power reels 1507, 1532 and communication (COM) reels 1512, 1535 on the movable system 1500, reduced wear and damage to insulation of these cables may be achieved.

At the static system 1305, one or more gensets 1320 produce a three-phase AC power for distribution of power to the various rig components. The gensets 1320 produce lower voltage power (e.g., 600 V AC) for a transformer (XF) 1330 via a breaker B1 in a PCR 1325. The transformer 1330 steps up the lower voltage to a medium voltage such as 4,160 V. The PCR 1325 also includes a power connector (PC) 1335 coupled to the transformer 1330, a network connector (NC) 1345, a network node (NN) 1340 coupled to the network connector 1345, and a computer system (CS) 1350. The lower voltage power is provided to triplex (and/or other mud pumping system) skids 1355 via a set of breakers B2 and variable frequency drives (VFD), such as typically one breaker B2 and one VFD for each triplex 1355. Each triplex skid 1355 may be equipped with a high-pressure triplex pump (and/or other type of mud pump) coupled to a mud system 1360 for circulating mud in a wellbore. The lower voltage power is also provided to a power connector (PC) 1370 in a manifold skid 1365 via a breaker B3. The manifold skid 1365 may be equipped with a set of breakers to distribute power to other skids. For example, a set of breakers or power control systems (such as breaker B5) may distribute power to the mud system 1360, which may include multiple tanks and electrical devices (agitator, centrifugal pumps, etc). The manifold skid 1365 may also include a breaker B4 between the breaker B3 and the power connector 1370. The manifold skid 1365 also includes a network node (NN) 1375 coupled to a network connector (NC) 1380, and a PLC 1385.

The medium voltage power traverses the primary electrical power cable 1405 from the power connector 1335 to the power reel 1507 installed on the movable system 1500. An LER skid 1505 on the movable system 1500 includes a transformer (XF) 1510, as well as a network node (NN) 1517 and a network connector (NC) 1515, which is coupled to the communication reel 1512, such for controlling a setting on the LER skid 1505. The transformer 1510 steps down the medium voltage to a lower voltage such as 600 V. A set of breakers B10, B11 may be closed to provide 600V power on a distribution bus D11. The distribution bus D11 feeds power to a top drive (TD) 1565 of a central package 1555 via a breaker B12 and a corresponding VFD, as well as to a drawworks (DW) 1560 of the central package 1555 via a breaker B13 and a corresponding VFD. The distribution bus D11 also provides power to a DCR 1520 via a breaker B14 and a power connector (PC) 1522. The distribution bus D11 may also feed power to a transfer pump (TRP) 1552 of a shaker skid 1550 via a breaker B15 and a corresponding VFD, and other components (e.g., an agitator, shaker motors, vacuum pumps, etc., collectively designated as COMP in the figures) 1553 of the shaker skid 1550 via a breaker B16.

The lower voltage power traverses the secondary electrical power cable 1415 from the power connector 1370 to the power reel 1532 of a support skid 1530. The support skid 1530 also includes the communication reel 1535. The lower voltage power is coupled to a power connector (PC) 1542 of a pressure (PR) control (CNTL) skid 1540 and the breaker B11. The pressure control skid 1540 also includes a network connector (NC) 1545 and network node (NN) 1547. With respect to the central package 1555, the drawworks 1560 includes a network node (NN) 1562, and the top drive 1565 includes a network node (NN) 1567 and a PLC 1570. The DCR 1520 includes the power connector 1522, a network node (NN) 1525, and a computer system (CS) 1527.

The primary communication cable 1410 terminates at the network connector 1345 of the PCR 1325 on the static system 1305, extends the variable distance 1425 to the movable system 1500, and terminates at the network connector 1515 via the communication reel 1512 of the movable system 1500. Likewise, the secondary electrical communication cable 1420 terminates at the network connector 1380 of the manifold skid 1365 on the static system 1305, extends the variable distance 1425 to the movable system 1500, and terminates at the network connector 1545 of the pressure control skid 1540 via the communication reel 1535 of the support skid 1530.

On the static system 1305, the primary and secondary communication cables 1410, 1420 are linked together via the network nodes 1340, 1375 coupled to the network connectors 1345, 1380, respectively. On the movable system 1500, the primary communication cable 1410 is coupled via the network connector 1515 and the network node 1517 to the network node 1525 of the DCR 1520, which is coupled to the network node 1562 of the drawworks 1560, which is coupled to the network node 1567 of the top drive 1565, which is coupled to the network node 1547 (via the network connector 1545) of the pressure control skid 1540. Thus, the primary and secondary communication cables 1410, 1420 form a ring network between the static system 1305 and the movable system 1500. In this manner, a data fault in the static system 1305, the movable system 1500, or in the umbilicals 1310, 1315 can be safely accommodated and data communication can be maintained. The primary and secondary communication cables 1410, 1420 are formed with plural conductors to permit serial and/or parallel data communication (analog and/or digital) between the static system 1305 and the movable system 1500.

As illustrated, the communication reel 1512 is located in a first location (such as a reel module (RM) 1501) of the movable system 1500, and the communication reel 1535 is located in a second location (section such as the support skid 1530) of the movable system 1500. The medium voltage level is selected to manage conduction losses by reducing the current in the primary power cable 1405. The power distribution system 1300 permits power to be transmitted from the static system 1305 to the movable system 1500 over redundant cables to permit the system to safely react to a fault in one of the umbilicals 1310, 1315, in the static system 1305, or in the movable system 1500. Selected ones of the breakers (e.g., the breakers B1, B10, B11) provide a circuit-breaker function for over-current protection and for a manual or remote power disconnect function. As an example, under control of ones of the computer systems (e.g., CS 1350), ones of the breakers (e.g., the breaker B1) can de-select (disable) the primary electrical power cable 1405, so as to couple electrical power from a stationary electrical power source at the static or stationary system 1305 to a load at the movable system 1500 over the secondary power cable 1415. The breakers receive control signals from the computer systems to select the power cable to provide power from the static or stationary system 1305 to the load at the movable system 1500.

Figure 22:
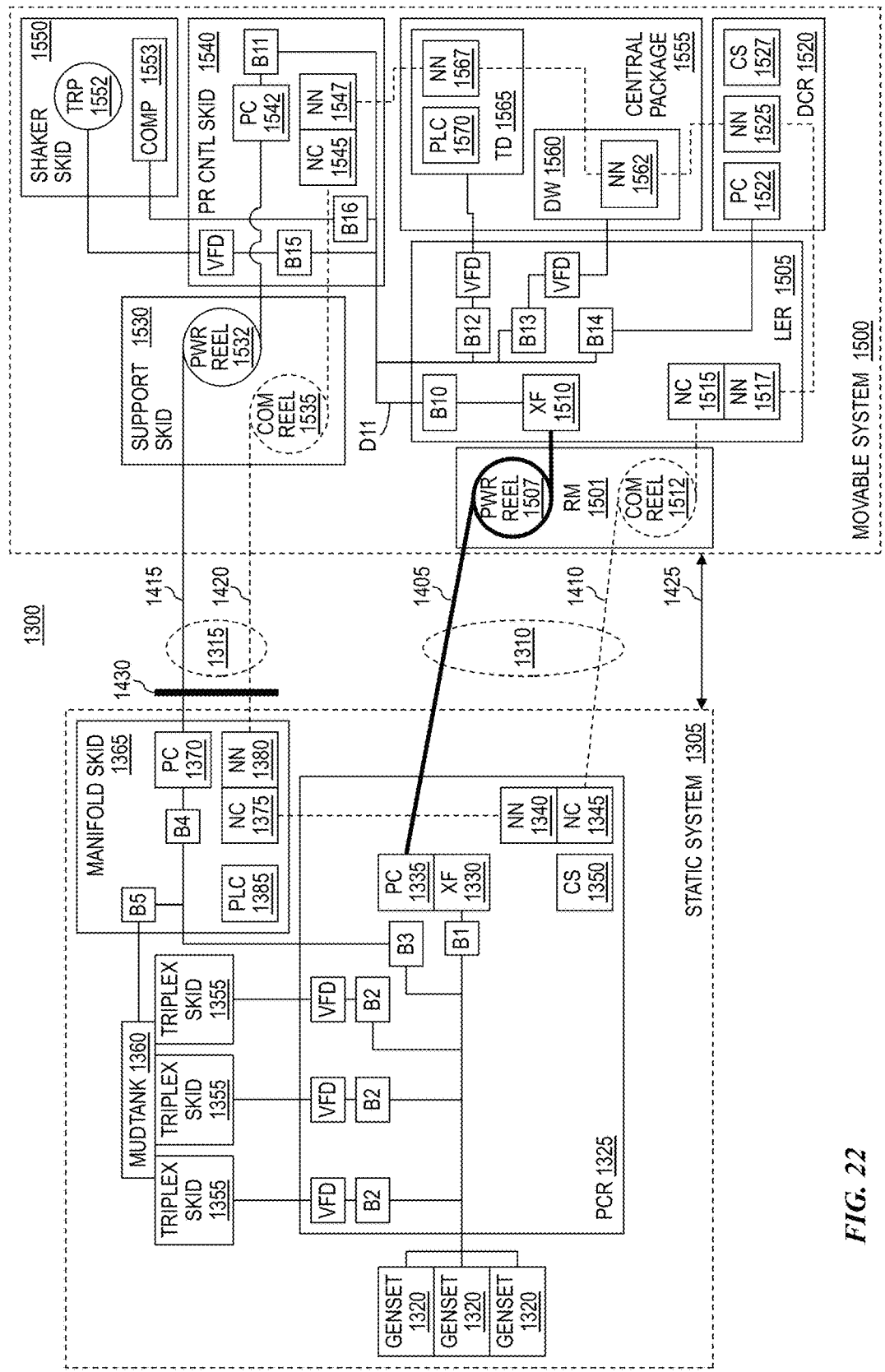
FIG. 22 is a schematic view of at least a portion of an example implementation of apparatus according to one or more aspects of the present disclosure.

FIG. 22 is a schematic view of the power distribution system 1300 shown in FIG. 21 with the addition of a fault 1430 occurring with respect to the secondary umbilical 1315. With the secondary umbilical 1315 unavailable, the breaker B4 terminates operation of the secondary electrical power cable 1415. However, the power and information may traverse the primary umbilical 1310 between the static system 1305 and the movable system 1500. Thus, the wellsite operations may continue due to the redundant power distribution system 1300. Of course, other breakers may be positioned to deselect the secondary power cable 1415, and the secondary communication cable 1420 may still be operable even though the secondary power cable 1415 is not working.

Figure 23:
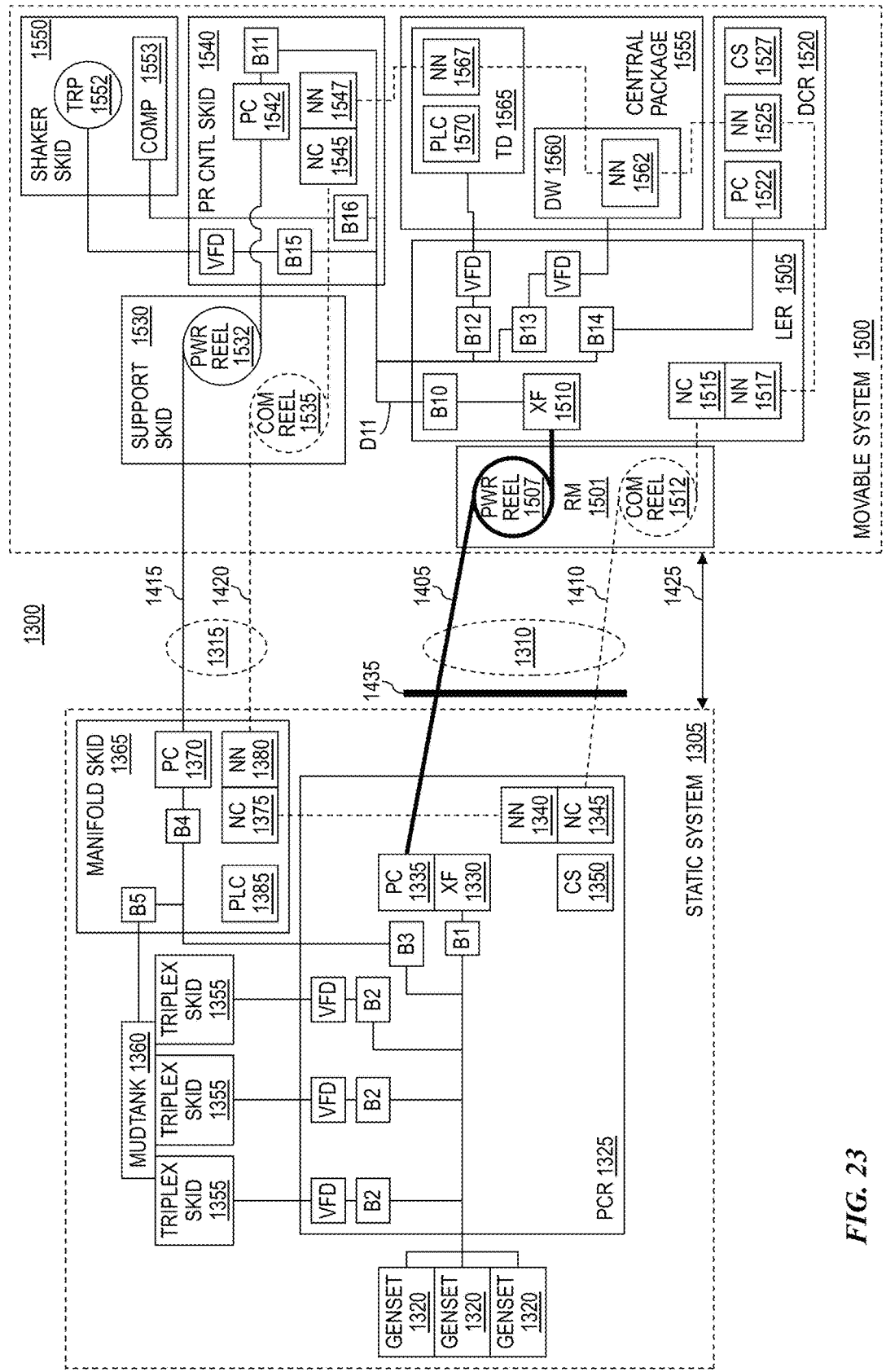
FIG. 23 is a schematic view of at least a portion of an example implementation of apparatus according to one or more aspects of the present disclosure.

FIG. 23 is a schematic view of the power distribution system 1300 shown in FIG. 21 with the addition of a fault 1435 occurring with respect to the primary umbilical 1310. With the primary umbilical 1310 unavailable, the breaker B1 terminates operation of the primary electrical power cable 1405. However, the power and information may traverse the secondary umbilical 1315 between the static system 1305 and the movable system 1500. Thus, the wellsite operations may continue due to the redundant power distribution system 1300. Of course, other breakers may be positioned to deselect the primary power cable 1405, and the primary communication cable 1410 may still be operable even though the primary power cable 1405 is not working.

Figure 24:
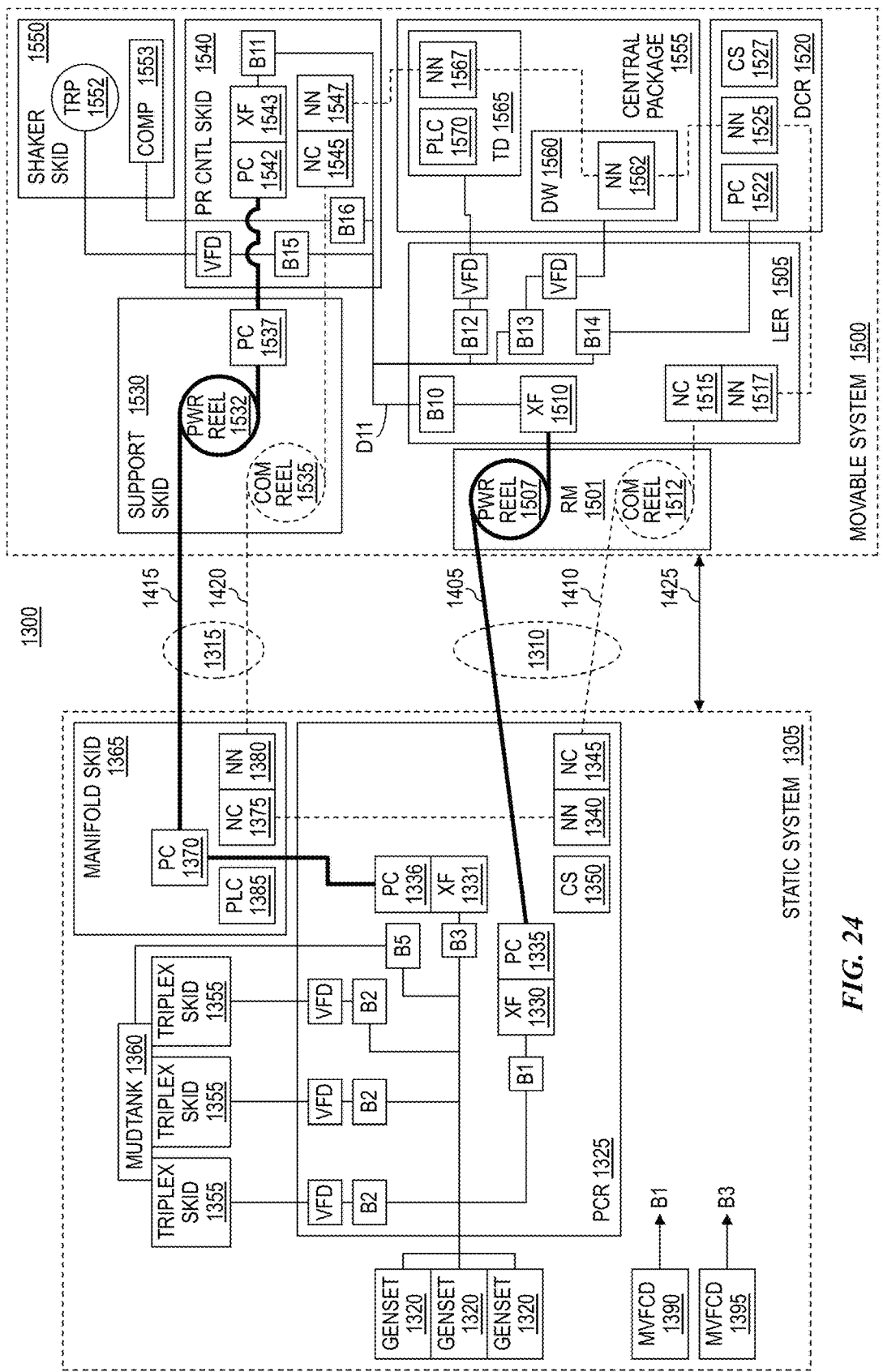
FIG. 24 is a schematic view of at least a portion of an example implementation of apparatus according to one or more aspects of the present disclosure.

FIG. 24 is a schematic view of at least a portion of another implementation of the power distribution system 1300 shown in FIG. 21 with the exception that medium voltage power (e.g., 4,160 V) traverses the secondary electrical power cable 1415 instead of the lower voltage (e.g., 600 V) power. In this implementation, the medium voltage power from a transformer 1331 is coupled to the power connector 1370 (via a power connector 1336) and traverses the secondary electrical power cable 1415 via the power reel 1532.

(It is also contemplated that the transformers 1330, 1331 may be integrated, or a single transformer.) A power connector 1537 in the support skid 1530 is coupled to a power connector 1542 in the pressure control skid 1540, which is coupled to a transformer 1543. The transformer 1543 steps down the medium voltage to a lower voltage, which is resident on the distribution bus D11 via the breaker B11.

With respect to the static system 1305, the control system includes first and second MVFCDs 1390, 1395 analogous to the MVFCD 1025 of FIG. 19. The first MVFCD 1390 can monitor the operation of the primary power cable 1405 and, perhaps with other control electronics, send a control signal to the breaker B1 to terminate operation thereof if there is a fault (or other decision criteria) with respect to the primary power cable 1405. Similarly, the second MVFCD 1395 can monitor the operation of the secondary power cable 1415 and, perhaps with other control electronics, send a control signal to the breaker B3 to terminate operation thereof if there is a fault (or other decision criteria) with respect to the secondary power cable 1415. It should be noted with respect to FIGS. 21-24 that the breakers include a control input to receive control signals to control the operation thereof. Also, it should be noted the mud system 1360 in FIG. 24 is powered from the gensets 1320 via a breaker B5. As mentioned above, the other components within the power distribution system 1300 of FIG. 24 are analogous to the components as described above.

Figure 25:
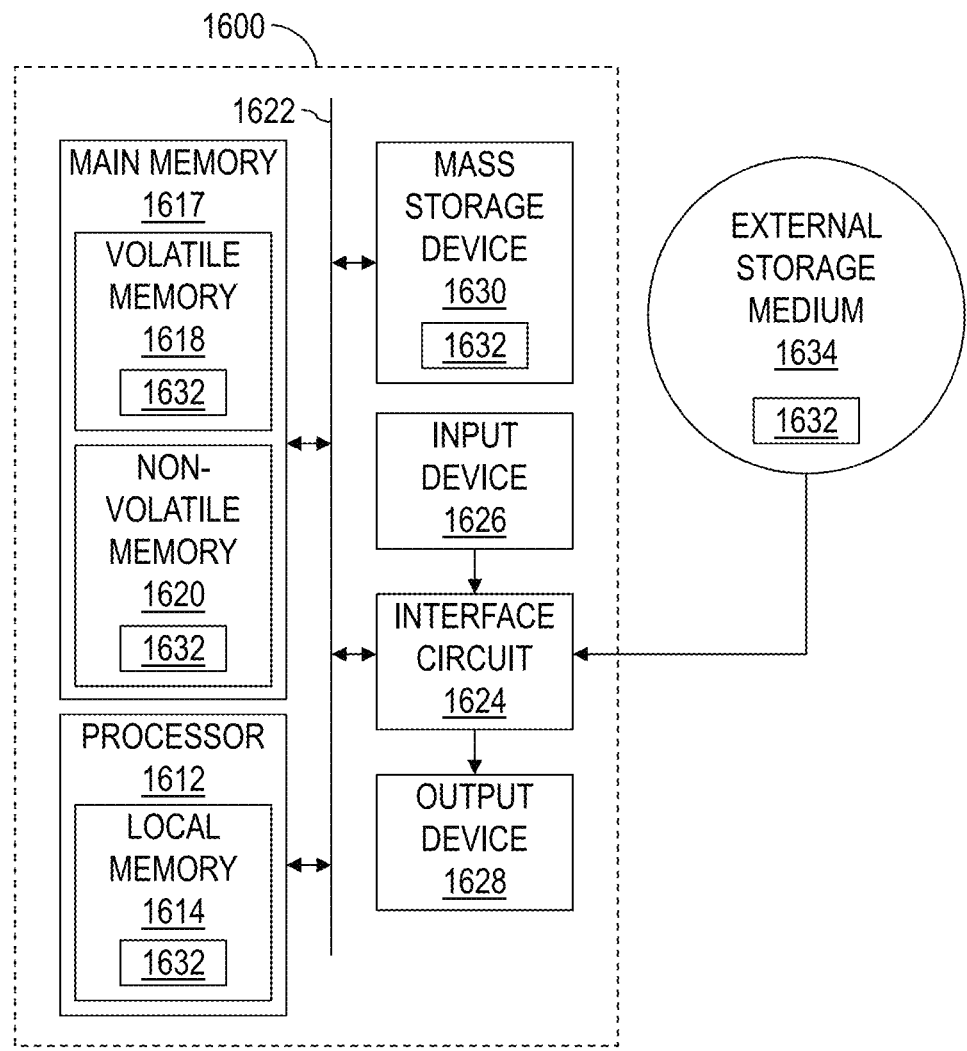
FIG. 25 is a schematic view of at least a portion of an example implementation of a processing system 1600 according to one or more aspects of the present disclosure.

FIG. 25 is a schematic view of at least a portion of an example implementation of a processing system 1600 according to one or more aspects of the present disclosure. The processing system 1600 may be an example of each of the processing systems 910 and 930 in FIG. 18 and may execute example machine-readable instructions to implement at least a portion of one or more of the methods and/or processes described herein.

The processing system 1600 may be or comprise, for example, one or more processors, controllers, special-purpose computing devices, server devices, personal computers, network appliances, programmable logic controller (PLC), industrial computer, and/or other types of computing devices. Various functionalities and components of a processing system can be in a single device or distributed across multiple devices.

The processing system 1600 comprises a processor 1612 such as, for example, a general-purpose programmable processor. The processor 1612 may comprise a local memory 1614, and may execute program code instructions 1632 present in the local memory 1614 and/or in another memory device. The processor 1612 may execute, among other things, machine-readable instructions or programs to implement the methods and/or processes described herein. The programs stored in the local memory 1614 may include program instructions or computer program code that, when executed by an associated processor, may facilitate functionality as described herein. The processor 1612 may be, comprise, or be implemented by one or more processors of various types operable in the local application environment, and may include one or more general purpose processors, special-purpose processors, microprocessors, digital signal processors (DSPs), field-programmable gate arrays (FPGAs), application-specific integrated circuits (ASICs), processors based on a multi-core processor architecture, and/or other processors. More particularly, examples of a processor 1612 include one or more INTEL microprocessors, microcontrollers from the ARM and/or PICO families of microcontrollers, embedded soft/hard processors in one or more FPGAs, etc.

The processor 1612 may be in communication with a main memory 1617, such as via a bus 1622 and/or other communication means. The main memory 1617 may comprise a volatile memory 1618 and a non-volatile memory 1620. The volatile memory 1618 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 1620 may be, comprise, or be implemented by a tangible, non-transitory storage medium, such as read-only memory, flash memory and/or other types of memory devices. One or more memory controllers (not shown) may control access to the volatile memory 1618 and/or the non-volatile memory 1620.

The processing system 1600 may also comprise an interface circuit 1624 connected and communicatively coupled to the bus 1622. The interface circuit 1624 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 1624 may also comprise a graphics driver card. The interface circuit 1624 may also comprise a communication device such as a modem or network interface card to facilitate exchange of data with external computing devices via a network, such as via Ethernet connection, digital subscriber line (DSL), telephone line, coaxial cable, cellular telephone system, and/or satellite, among other examples.

One or more input devices 1626 may be connected to the interface circuit 1624. One or more of the input devices 1626 may permit a user to enter data and/or commands for utilization by the processor 1612. Each input device 1626 may be, comprise, or be implemented by a keyboard, a mouse, a touchscreen, a track-pad, a trackball, an image/code scanner, and/or a voice recognition system, among other examples.

One or more output devices 1628 may also be connected to the interface circuit 1624. One or more of the output device 1628 may be, comprise, or be implemented by a display device, such as a liquid crystal display (LCD), a light-emitting diode (LED) display, and/or a cathode ray tube (CRT) display, among other examples, which may further facilitate the GUIs 920 and 940 described above. One or more of the output devices 1628 may also or instead be, comprise, or be implemented by a printer, speaker, and/or other examples.

The processing system 1600 may also comprise a mass storage device 1630 for storing machine-readable instructions and data. The mass storage device 1630 may be connected to the interface circuit 1624, such as via the bus 1622. The mass storage device 1630 may be or comprise a tangible, non-transitory storage medium, such as a floppy disk drive, a hard disk drive, a compact disk (CD) drive, and/or digital versatile disk (DVD) drive, among other examples. The program code instructions 1632 may be stored in the mass storage device 1630, the volatile memory 1618, the non-volatile memory 1620, the local memory 1614, and/or on a removable storage medium 1634, such as a CD or DVD.

The modules and/or other components of the processing system 1600 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces an apparatus comprising: a first electrical power cable extending a variable distance between a static system at a wellsite and a movable system at the wellsite; a second electrical power cable extending the variable distance between the static system and the movable system; and at least one set of breakers operable to select either of the first and second electrical power cables to couple electrical power from a stationary electrical power source at the static system to a load at the movable system.

The at least one set of breakers may be configured to select either of the first and second electrical power cables based on information from a component of the wellsite. The information may be indicative of an electrical fault associated with either of the first and second electrical power cables.

The apparatus may further comprise a controller operable to receive information about either of the first and second electrical power cables and provide a control signal to the at least one set of breakers to automatically select either of the first and second electrical power cables based thereon.

The apparatus may further comprise a first controller configured to receive information about the first electrical power cable and a second controller configured to receive information about the second electrical power cable, wherein the at least one set of breakers may select either of the first and second electrical power cables based on control signals from the first and second controller. The first and second controllers may be located at the movable system.

The at least one set of breakers may be operable to select the second electrical power cable within one second (or perhaps 50 milliseconds or less) of the apparatus receiving information about the first electrical power cable.

The at least one set of breakers comprises a first breaker and a second breaker each at the static system. The first breaker may be coupled to a first transformer at the static system and the second breaker may be coupled to a second transformer at the static system. The first transformer and the second transformer may step up a first voltage to a second voltage for transmission over a selected one of the first and second electrical power cables. The second voltage may be a medium voltage. The medium voltage may be 4,160 volts.

The first and second electrical power cables may be wound onto respective first and second rotatable spools in a manner permitting unwinding therefrom. The first and second rotatable spools may be located at the movable system. The first and second rotatable spools may be located at first and second modules, respectively, of the movable system.

The apparatus may further comprise a communication cable extending the variable distance to transmit information between the movable system and the static system. The information may be transmitted from the movable system to the static system and may indicative of an electrical fault. The electrical fault may be associated with the first electrical power cable and the at least one set of breakers may be operable to select the second electrical power cable as a result thereof. The communication cable may be a first communication cable and the apparatus may further comprise a second communication cable extending the variable distance to transmit the information between the movable system and the static system. The first and second communication cables may form a ring architecture. The ring architecture may be fault tolerant to permit data exchange between communication nodes when one of the first and second communication cables is unavailable. The first and second communication cables may be wound onto respective first and second rotatable spools in a manner permitting unwinding therefrom. The first and second rotatable spools may be located at the movable system.

The first electrical power cable may provide the electrical power at a first voltage and the second electrical power cable may provide the electrical power at a second voltage. The first electrical power cable may provide the electrical power at the first voltage to power a top drive and drawworks at the movable system.

The present disclosure also introduces a method comprising: at a wellsite, providing electrical power from a stationary electrical power source at a static system to a load at a movable system via a first electrical power cable extending a variable distance between the static system and the movable system; selecting a second electrical power cable extending the variable distance between static system and the movable system; and providing electrical power from the stationary electrical power source to the load via the second electrical power cable.

Providing the electrical power via the first and second electrical power cables may power a wellsite operation. The wellsite operation may comprise at least one of a drilling operation and a well control operation. Providing the electrical power via the first electrical power cable may power a first wellsite operation and providing the electrical power via the second electrical power cable may power a second wellsite operation. The first wellsite operation may comprise a drilling operation and the second wellsite operation may comprise a well control operation.

Selecting the second electrical power cable may be based on information about the first electrical power cable. The information may be indicative of an electrical fault associated with the first electrical power cable.

Selecting the second electrical power cable may be within one second (or perhaps 50 milliseconds) of receiving information about the first electrical power cable.

The first electrical power cable may be coupled to a first transformer at the static system, and the second electrical power cable may be coupled to a second transformer at the static system. The method may further comprise stepping up a first voltage to a second voltage via the first and second transformers for transmission over the first and second electrical power cables, respectively. The second voltage may be a medium voltage. The medium voltage may be 4,160 volts.

The method may further comprise arranging the first and second electrical power cables onto respective first and second rotatable spools in a manner permitting unwinding therefrom.

The method may further comprise providing information between the movable system and the static system via a communication cable extending the variable distance therebetween. The information may be transmitted from the movable system to the static system, and may be indicative of an electrical fault associated with the first electrical power cable. The communication cable may be a first communication cable, and the method may further comprise selecting a second communication cable extending the variable distance between the static system and the movable system. The method may further comprise providing information between the movable system and the static system via the second communication cable.

Providing the electrical power via the first and second electrical power cables may be at a first voltage and a second voltage, respectively. The first voltage may be a medium voltage and the second voltage may be a low voltage. The medium voltage may be 4,160 volts and the low voltage may be 600 volts.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method, comprising:
    at a wellsite, providing electrical power from a stationary electrical power source at a static system to a load at a movable system via a first electrical power cable extending a variable distance between the static system and the movable system;
    selecting a second electrical power cable extending the variable distance between the static system and the movable system;
    providing electrical power from the stationary electrical power source to the load via the second electrical power cable;
        wherein providing the electrical power via the first and second electrical power cables is at a first voltage and a second voltage, respectively,
        wherein the first voltage is a medium voltage and the second voltage is a low voltage, and
        wherein the medium voltage is 4,160 volts and the low voltage is 600 volts,
    providing information between the movable system and the static system via a communication cable extending the variable distance therebetween;
        wherein the information is transmitted from the movable system to the static system and is indicative of an electrical fault associated with the first electrical power cable, and
        wherein the communication cable is a first communication cable,
    selecting a second communication cable extending the variable distance between the static system and the movable system; and
    providing information between the movable system and the static system via the second communication cable.

2. The method of claim 1 wherein providing the electrical power via the first and second electrical power cables powers a wellsite operation.

3. The method of claim 2 wherein the wellsite operation comprises at least one of a drilling operation and a well control operation.

4. The method of claim 1 wherein providing the electrical power via the first electrical power cable powers a first wellsite operation and providing the electrical power via the second electrical power cable powers a second wellsite operation.

5. The method of claim 4 wherein the first wellsite operation comprises a drilling operation and the second wellsite operation comprises a well control operation.

6. The method of claim 1 wherein selecting the second electrical power cable is within one second of receiving information about the first electrical power cable.

7. The method of claim 1 wherein the first electrical power cable is coupled to a first transformer at the static system and the second electrical power cable is coupled to a second transformer at the static system.

8. The method of claim 7 further comprising stepping up a first voltage to a second voltage via the first and second transformers for transmission over the first and second electrical power cables, respectively.

9. The method of claim 1 further comprising arranging the first and second electrical power cables onto respective first and second rotatable spools in a manner permitting unwinding therefrom.

* * * * *